(12) United States Patent
Sparrowhawk et al.

(10) Patent No.: US 7,714,227 B2
(45) Date of Patent: May 11, 2010

(54) CABLE JUNCTION BOX CONFIGURED TO STORE ONE OR MORE COILS OF CABLE

(75) Inventors: Bryan L. Sparrowhawk, Monroe, WA (US); John L. Seger, Brier, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 188 days.

(21) Appl. No.: 11/840,882

(22) Filed: Aug. 17, 2007

(65) Prior Publication Data

US 2009/0047828 A1   Feb. 19, 2009

(51) Int. Cl.
*H01J 5/00* (2006.01)
(52) U.S. Cl. ...................................................... 174/50
(58) Field of Classification Search .............. 439/106, 439/76.1; 174/50, 58, 48; 362/365; 385/134, 385/135, 137
See application file for complete search history.

(56) References Cited

U.S. PATENT DOCUMENTS

| | | | | | |
|---|---|---|---|---|---|
| 5,086,194 | A | * | 2/1992 | Bruinsma | 174/494 |
| 5,374,812 | A | * | 12/1994 | Chan et al. | 220/3.6 |
| 6,004,011 | A | * | 12/1999 | Sieczkowski | 362/365 |
| 6,174,199 | B1 | * | 1/2001 | Rushing | 439/575 |
| 6,351,591 | B1 | * | 2/2002 | Daoud | 385/135 |
| 6,379,166 | B1 | * | 4/2002 | Hagarty et al. | 439/135 |
| 7,381,893 | B2 | * | 6/2008 | Kerr, Jr. | 174/58 |

OTHER PUBLICATIONS

Hubbell Premise Wiring Catalog, Netselect residential telecommunications products, p. L2.
Panduit Network Connectivity Group, specification sheet, Mini-Com Multi-Media/fiber Surface Mount Boxes, 2002.
Hubbell Premise Wiring; 10GBE UTP/FTP Augmented Category 6 Cabling Installation Guidelines; Catalog; Aug. 2007; 30 pages; Hubbell; http://www.hubbell-premise.com; USA.
Randl Industries, Inc.; Making Communications & Fire Protection More Reliable and Cost-Effective; Product Specifications T-55017; 2008; 1 page; Randl Industries, Inc.; Spokane, WA; USA.

(Continued)

*Primary Examiner*—Chandrika Prasad
(74) *Attorney, Agent, or Firm*—Davis Wright Tremaine LLP; George C. Rondeau, Jr.; Heather M. Colburn

(57) ABSTRACT

A cable junction box has a curved shape to at least part of its enclosure allowing for coiling of extra cable length into a desired service loop within the enclosure. The cable junction box has a cover with a mud ring integrated with a wall plate bracket to allow for interfacing with a wall and has a cable input to receive cabling into the enclosure. Attachment plates are located on the periphery of the enclosure to be selectively used to attach the cable junction box to a mounting bracket coupled to a wall stud. The attachment plates allow for flexibility in positioning of the cable junction box to be attached to the wall stud. The enclosure has connection locations for the front cover and other connection locations for the cable inlet to allow for further flexibility in positioning of the front cover and the cable inlet.

43 Claims, 29 Drawing Sheets

OTHER PUBLICATIONS

Randl Industries, Inc.; Making Communications & Fire Protection More Reliable and Cost-Effective; Product Specifications TB-55057; 2008; 1 page; Randl Industries, Inc.; Spokane, WA; USA.

Carlon; Carlon Zip Box Blue Switch and Outlet Boxes; catalog; Jun. 2006; 22 pages; Carlon Lamson & Sessions; www.carlon.com; Cleveland, OH; USA.

Thomas & Betts; Products; Product information page from catalog; 2006; 3 pages; Thomas & Betts Corporation; www.tnb.com; Memphis, TN; USA.

Erico; Caddy Box Mounting Brackets - For Between Studs; Product Specification Sheet; 2008; 4 pages; Erico International Corporation; Solon, Ohio; USA as well as worldwide offices.

* cited by examiner

CABLE JUNCTION BOX CONFIGURED TO STORE ONE OR MORE COILS OF CABLE

BACKGROUND OF THE INVENTION

1. Field of the Invention

The present invention is directed generally to cable junction boxes.

2. Description of the Related Art

Construction codes, such as for commercial and institutional buildings, require cabling, such as for data, media, telecommunication, and communication systems, to be fully enclosed by a conduit system within walls, floors, and other members of building structures. Cabling typically is terminated with wall connectors having a wall plate on a room side of a wall and a cable junction box behind the wall out of view from within the room.

Typically, extra length of cabling is stored behind the wall at the junction box so that the cabling can be temporarily extended away from the junction box to allow for better access to the cabling when initially terminating the cabling with the wall connections. The extra length is also helpful for later servicing such as when the cabling must be trimmed for re-termination with replacement wall connectors. Generally, the extra cabling is coiled or otherwise wound in what is known as service loops.

Unfortunately, at least some modern cabling has very large diameter and is consequently relatively stiff, which makes storage of the extra length of cabling behind the wall more difficult. Furthermore, construction codes require minimum bend radii based upon cable diameter, so as cable diameter increases, the minimum radius required for a bend in the cable increases and the service loops need to be larger to be compliant with code. Construction efforts can be slowed down in installing the cabling with the service loops and can require larger storage space behind the wall, which may not be provided by existing junction boxes without greatly increasing the area used. In other cases, code is violated by using smaller radii service loops with conventional junction boxes given space limitations behind the wall. Sometimes, the extra cabling is positioned in a location remote from the junction box, which adds other problems regarding installation and servicing. Other problems can occur with construction and maintenance of the cabling such as impingement of the cabling by objects or kinking of the cabling through improper handling.

BRIEF DESCRIPTION OF THE SEVERAL VIEWS OF THE DRAWING(S)

DETAILED DESCRIPTION OF THE INVENTION

A cable junction box is disclosed herein having provision for service loops. The cable junction box has a curved portion to its main body or enclosure allowing for coiling of extra cable length into a desired service loop. The cable junction box has a cover with a mud ring integrated with a wall plate bracket to allow for interfacing with a wall. The cable junction box also has a cable input to receive cabling into the main body or enclosure. A plurality of attachment plates are located on the periphery of the main body or enclosure with one of the plurality of attachment plates used to attach the cable junction box to a mounting bracket coupled to a wall stud or other architectural construction member. The plurality of attachment plates allows for flexibility in positioning of the cable junction box for attachment to a wall stud behind the wall. The main body or enclosure has a plurality of connection points for the front cover and other connection points for the cable inlet to allow for further flexibility in positioning of the front cover and the cable inlet.

Figure 1:
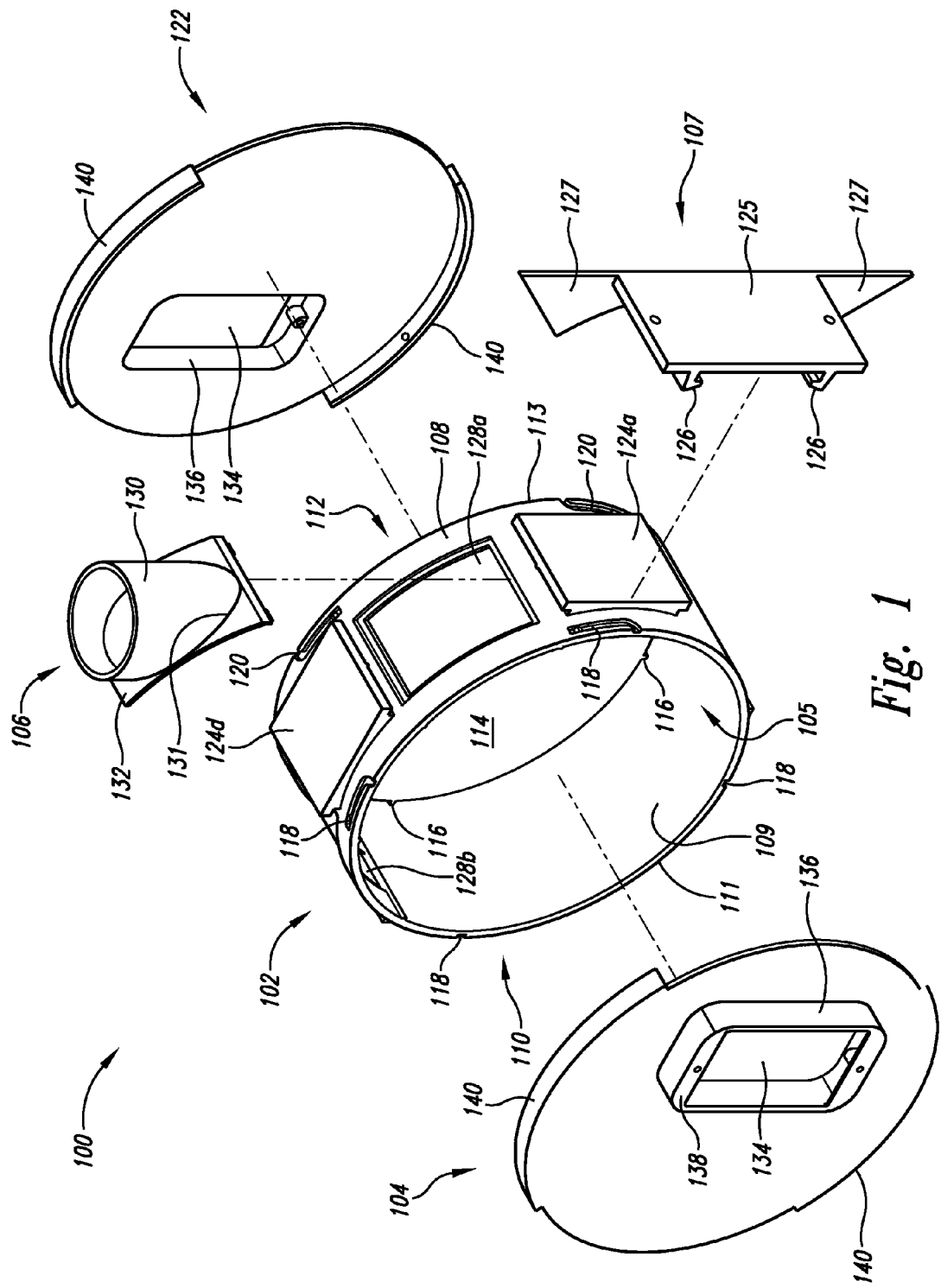
FIG. 1 is an exploded perspective view of a cable junction box according to the present invention.

An exemplary implementation of a cable junction box 100 according to the present invention is shown in FIG. 1 as having a main body or enclosure 102, a front cover 104, a cable inlet 106, and a mounting bracket 107. Inlet cable 106 may be adapted to accept varying sizes of conduit singly or in variously sized multiple conduits. The enclosure 102 has a periphery or peripheral outer surface portion 108 that is shown as substantially circular or cylindrical, but in other implementations can have other surface shapes. As shown, the peripheral surface portion circumscribes an area. The enclosure 102 also has a curved interior surface portion 109 that is shown as being substantially circular but in other implementations can have other interior shapes so long as the shapes facilitate at least partial coiling of a service loop for communication cable having a minimum bend radius. The interior surface portion 109 defines an interior space 105 of the enclosure 102.

The enclosure 102 further has a first face 110 having an opening bounded by an edge 111 of the peripheral portion 108 and a second face 112 bounded by an edge 113 of the peripheral portion 108. A fixed rear cover 114 is integral with the edge 113, but can be removed from the enclosure 102 by breaking tabs 116. Rear cover 114 can optionally be constructed without engagement means but instead with partially perforated lines to permit punch out to eliminate rear cover 114 for ease of on-site installation. Engagement slots 118 are located near the edge 111 to be used to attach the front cover 104 to the enclosure 102. Engagement slots 120 are located near the edge 113 to be used to attach an optional rear cover 122 after the rear cover 114 has been removed. To service two rooms sharing an adjacent wall, the rear cover 114 can be removed and the optional rear cover 122 can be attached to the enclosure 102. The optional rear cover 122 is of the same design as the front cover 104.

Figure 9:
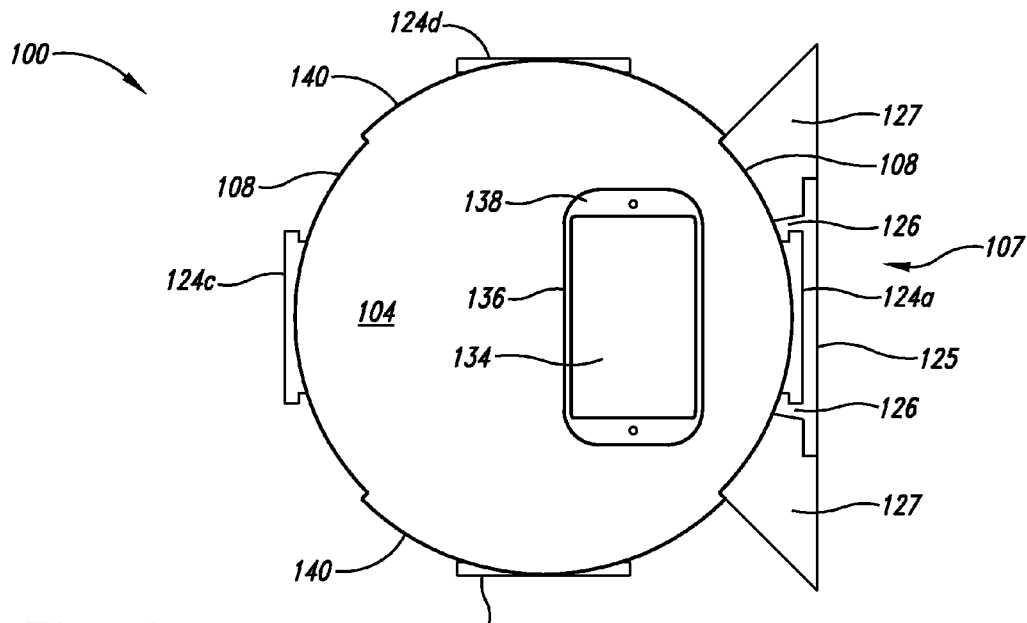
FIG. 9 is a front elevational view of the cable junction box with the mounting plate of FIG. 2 in the first orientation of FIG. 2.

The enclosure 102 further has a first attachment plate 124a, a second attachment plate 124b, a third attachment plate 124c, and a fourth attachment plate 124d (collectively known as attachment plates 124) that are spaced along the peripheral portion 108 at a first position, a second position, a third position, and a fourth position, respectively (FIG. 9 illustrates all of the depicted attachment plates). In other implementations spacing of the attachment plates 124 can vary according to design preference. Further shown in FIG. 1, the mounting bracket 107 has a mounting plate 125, rails 126, and a brace member 127.

The mounting plate 125 is used for attaching the mounting bracket 107 to a wall stud or other members of a building structure as discussed further below. The rails 126 extend as elongated channel members from the mounting plate 125 and are spaced apart to slidably receive therebetween a selected one of the attachment plates 124 in order to couple together the selected attachment plate and the mounting bracket 107. The attachment plates 124 are sized and shaped to be slid between and into the rails 126 of the attachment plates to couple together the enclosure 102 and the mounting bracket 107. The plurality of attachment plates 124 gives flexibility as to where the enclosure 102 will have the mounting bracket 107 attached and thus affords angular positioning options for the enclosure and the mounting bracket when being installed.

The peripheral portion 108 further has an opening 128a and an opening 128b, either of which can couple with the cable inlet 106. The openings 128a and 128b are located on opposite sides of the attachment plate 124a to provide positioning options for the cable inlet. The cable inlet 106 has a cable guide duct 130 as a cylindrical tube (other shapes are found in other implementations) with an end 131 shaped to match the curvature of the peripheral portion 108. Extending around the end 131 is a flange 132. The flange 132 is shaped and sized to match the curvature of the peripheral portion 108 and to mate with and cover either of the openings 128a and 128b both of which can include various attachment means such as screw, snap-on or pressure fit.

The front cover 104 has an opening 134 bordered by a mud ring 136, which is further integrated with a wall plate bracket 138 to which an exterior wall plate can be mounted using screws. The wall plate bracket 138 is sized and positioned so that the exterior wall plate is viewed from within the room defined by the wall in which the cable junction box 100 is installed. The front cover 104 has two opposingly spaced lip members 140 that overhang the edge 111 when the front cover 104 is attached to the enclosure 102 thereby allowing pins (not shown) protruding from the lip member to couple with one or more of the engagement slots 118 to secure the front cover to the enclosure.

Figure 2:
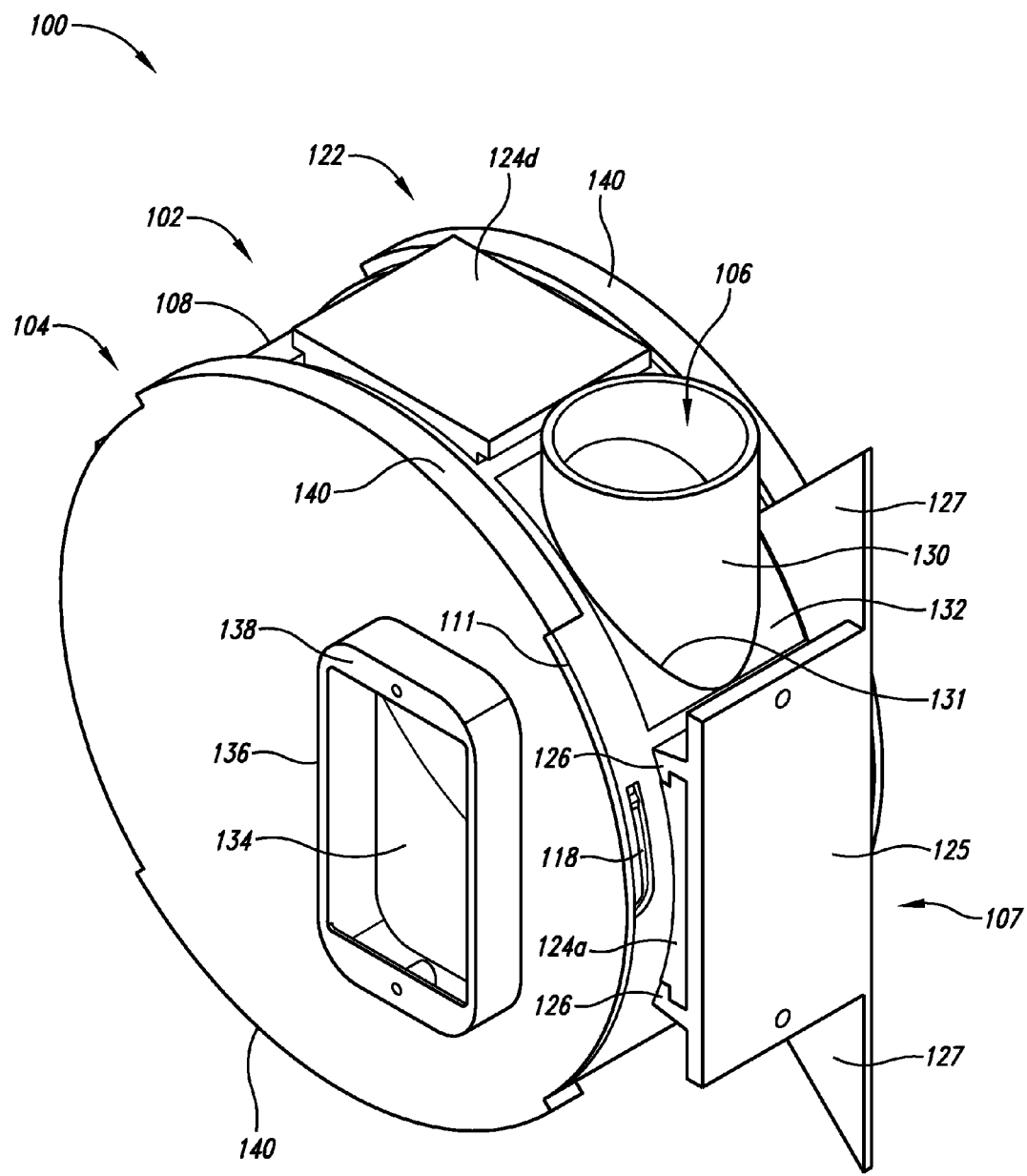
FIG. 2 is a right front perspective view of the cable junction box of FIG. 1.
Figure 3:
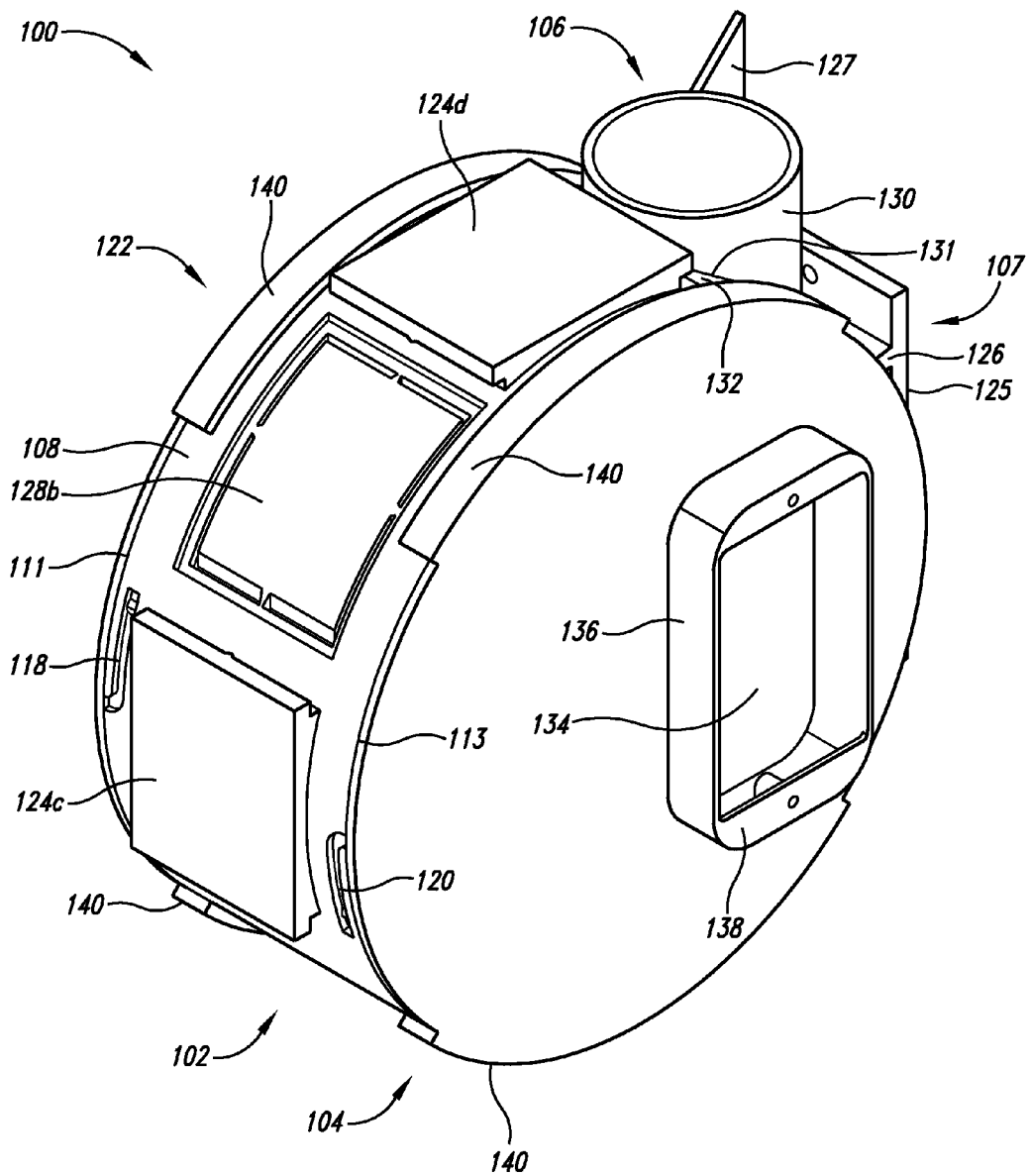
FIG. 3 is a left front perspective view of the cable junction box of FIG. 1.

The cable junction box 100 is shown in FIG. 2 and FIG. 3 with the cable inlet 106 engaged with the opening 128a in a first cable inlet orientation, with the front cover 104 engaged with a subset of the engagement slots 118 so as to be positioned in a first front cover orientation, and the mounting bracket 107 engaged with the attachment plate 124a so as to be positioned in a first attachment plate orientation.

Figure 4:
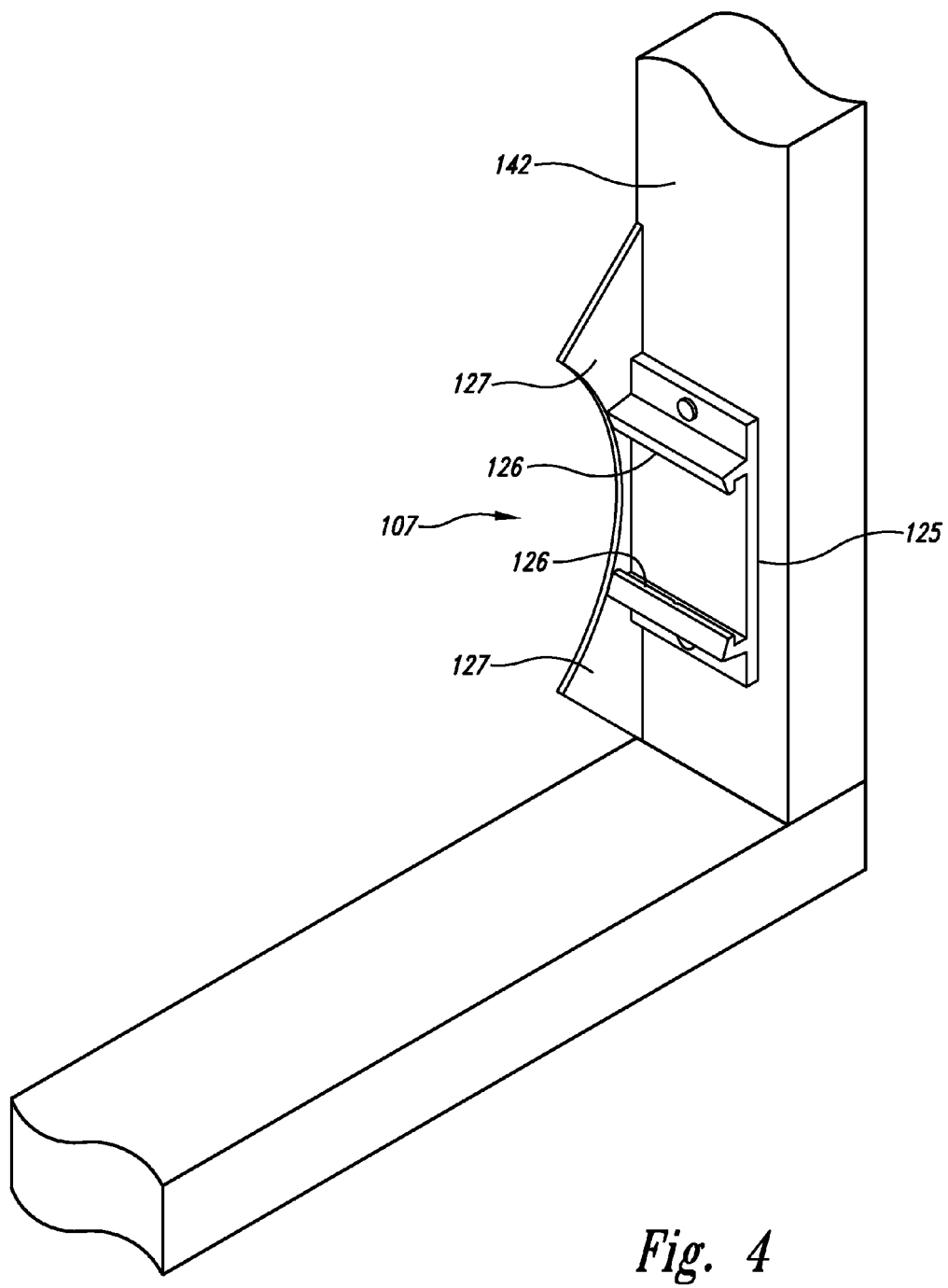
FIG. 4 is a perspective view of a mounting bracket for the cable junction box of FIG. 1, the mounting bracket shown attached to a wall stud.
Figure 5:
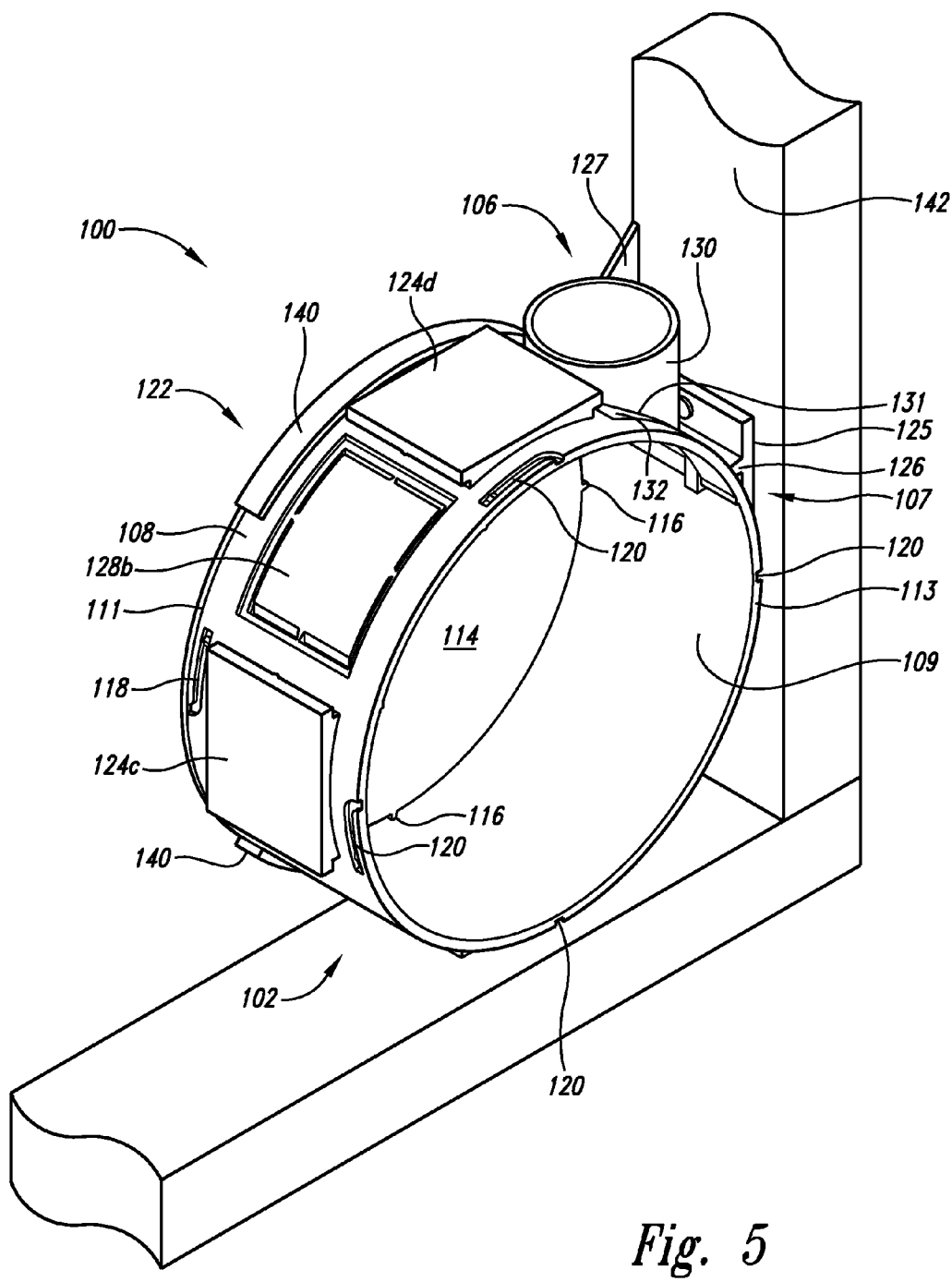
FIG. 5 is a perspective view of the cable junction box attached to the mounting bracket of FIG. 4 with its front cover removed.
Figure 6:
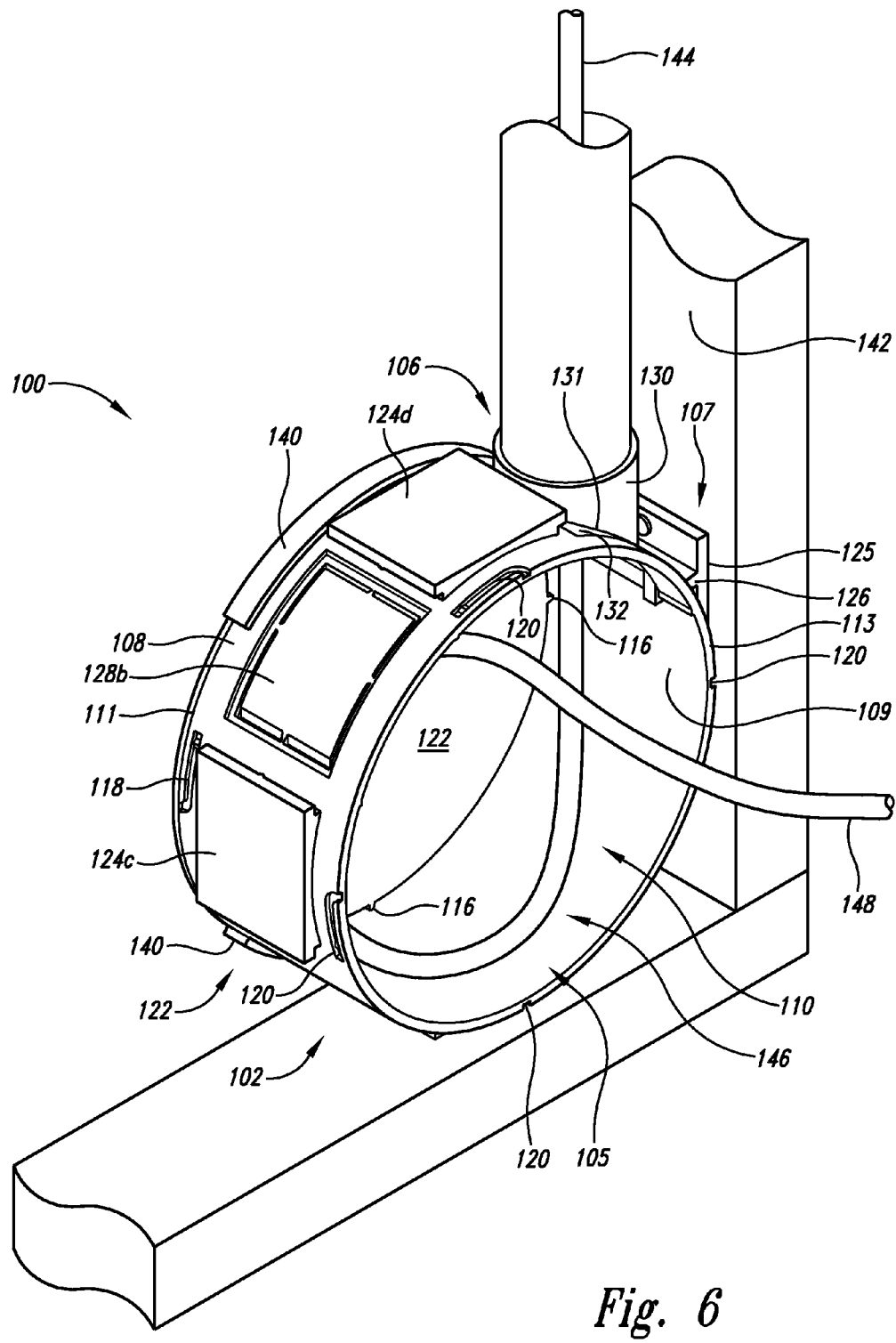
FIG. 6 is a perspective view of the cable junction box of FIG. 5 holding a cable.
Figure 7:
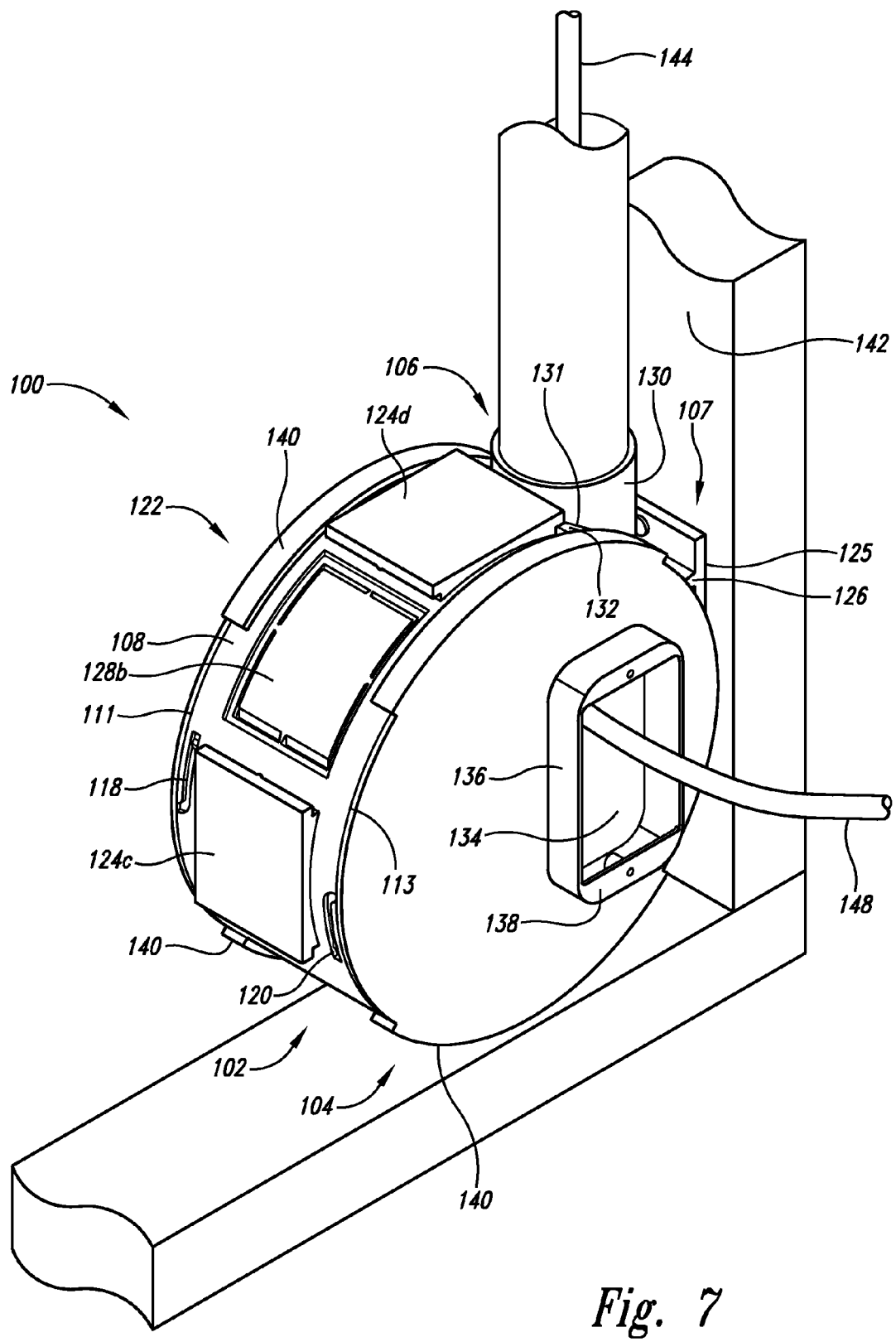
FIG. 7 is a perspective view of the cable junction box and cable of FIG. 6 with the front cover installed.
Figure 8:
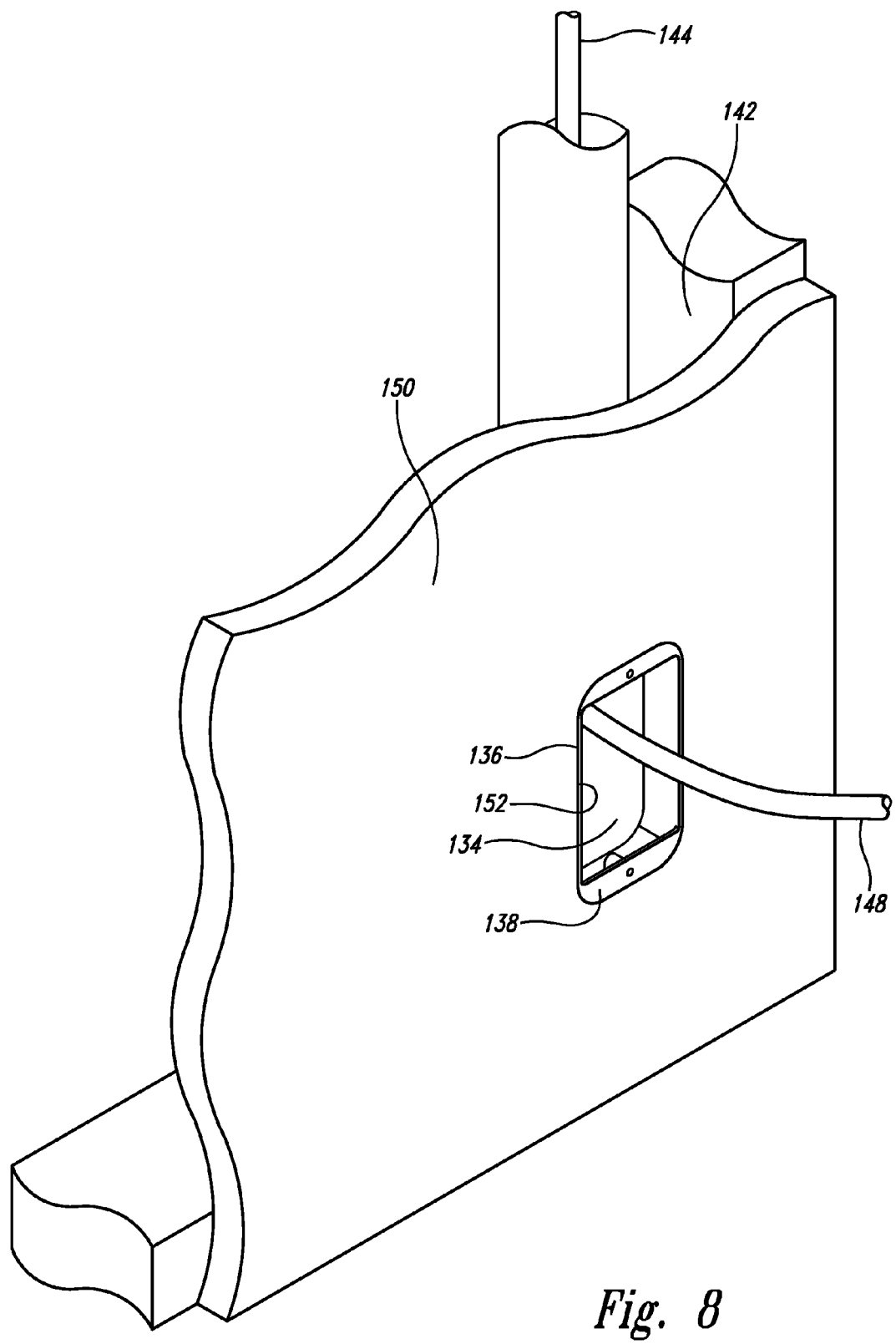
FIG. 8 is a perspective view of the wall plate portion of the cable junction box of FIG. 7 protruding through a wall.

As shown in FIG. 4, the mounting plate 125 of the mounting bracket 107 can be positioned flush with a wall stud 142 for coupling of the mounting bracket with the stud by screwing, nailing, gluing, and/or other ways. As shown in FIG. 5, the attachment plate 124a is then engaged with the mounting bracket 107 to secure the enclosure 102 to the wall stud 142. A cable 144, shown in FIG. 6, is fed through the cable guide duct 130 of the cable inlet 106 and is coiled inside of the interior space 105 (substantially cylindrical with other shapes in other implementations) of the enclosure 102 with the curved interior surface portion 109 having one or more radii of curvature to assist in supporting a service loop portion 146 of the cable with at least a minimum bend radius as specified for the cable with an end portion 148 of the cable extending out from the enclosure through the opening of the first face 110. As shown in FIG. 7, the front cover 104 is then engaged with the enclosure 102 in the first front cover orientation with the end portion 148 of the cable 144 extending through the opening 134 of the front cover. The front cover 104 is then engaged (shown in the first front cover orientation) with the enclosure 102, shown in FIG. 7, with the end portion 148 of the cable 144 extending through the opening 134 of the front cover. A wall 150, shown in FIG. 8, covers the cable junction box 100 with the wall plate bracket 138 of the front cover 104 extending through a hole 152 in the wall and the end portion 148 of the cable 144 extending through the opening 134 of the front cover 104.

Figure 10:
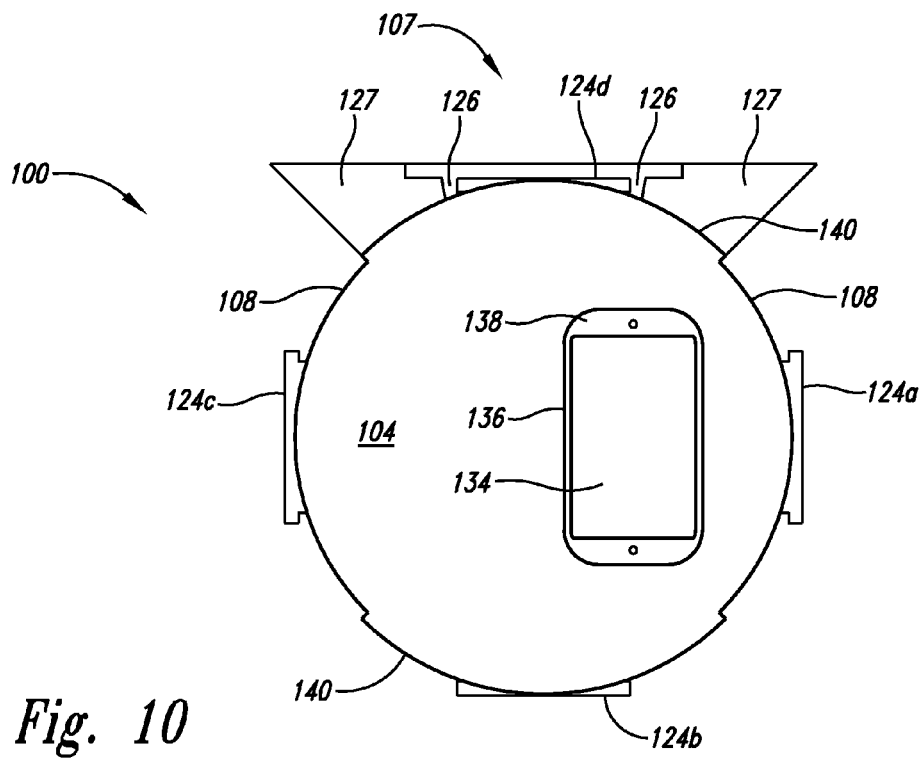
FIG. 10 is a front elevational view of the cable junction box with the mounting plate of FIG. 2 in a second orientation.
Figure 11:
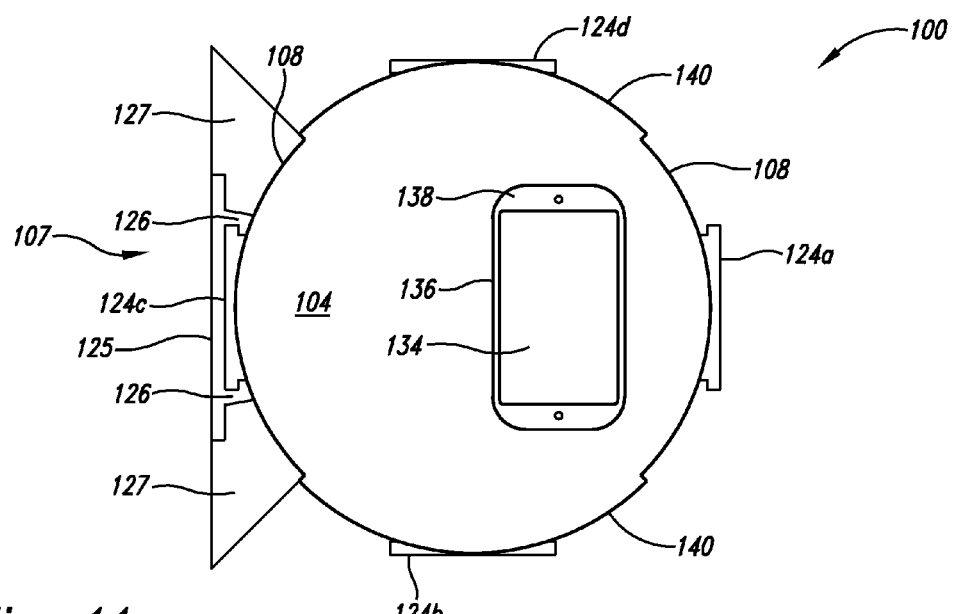
FIG. 11 is a front elevational view of the cable junction box with the mounting plate of FIG. 2 in a third orientation.
Figure 12:
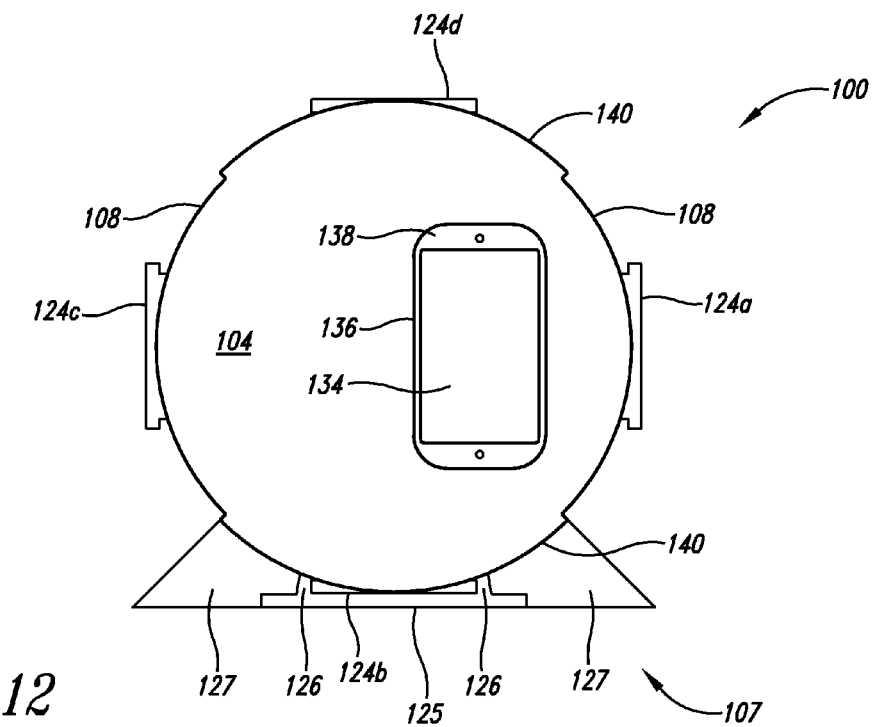
FIG. 12 is a front elevational view of the cable junction box with the mounting plate of FIG. 2 in a fourth orientation.

As discussed above, the attachment plates 124 provide various options for coupling the enclosure 102 to the mounting bracket 107 to allow for flexibility in angularly orienting the enclosure with respect to one or more members of inner wall building structures or angularly orienting the mounting bracket relative thereto. As shown in FIG. 9, the first attachment plate 124a is coupled with the mounting bracket 107 with the front cover 104 in the first attachment plate orientation. As shown in FIG. 10, the fourth attachment plate 124d is coupled with the mounting bracket 107 with the front cover 104 in the first attachment plate orientation. As shown in FIG. 11, the third first attachment plate 124c is coupled with the mounting bracket 107 with the front cover 104 in the third attachment plate orientation. As shown in FIG. 12, the second attachment plate 124b is coupled with the mounting bracket 107 with the front cover 104 in the first attachment plate orientation.

Figure 13:
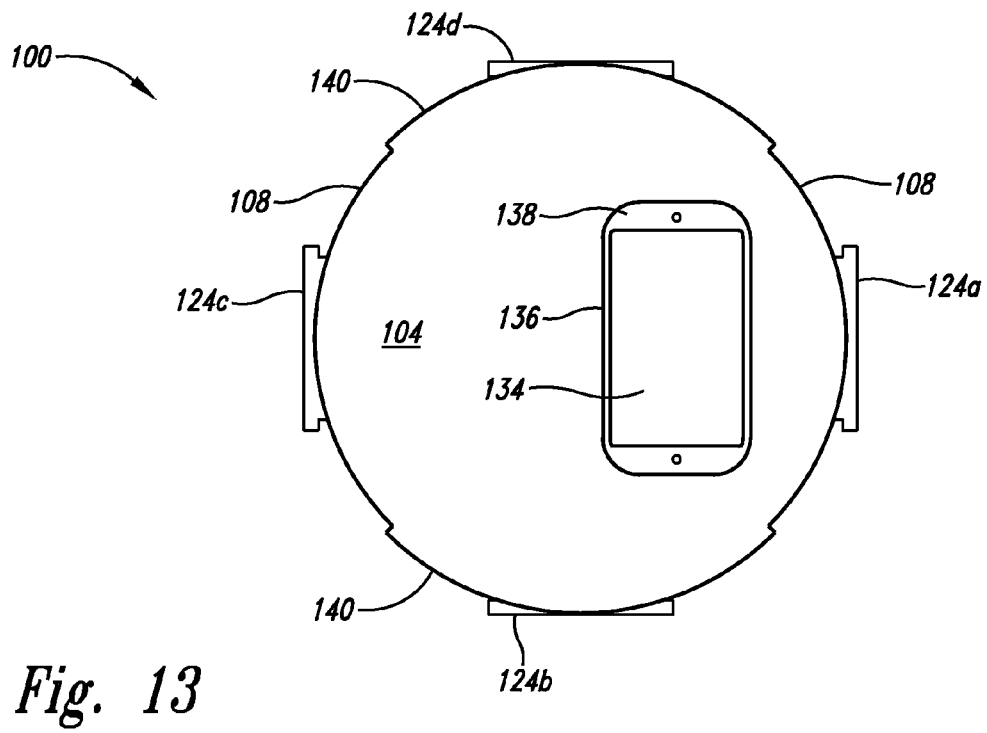
FIG. 13 is a front elevational view of the cable junction box with the front cover of FIG. 2 in the first orientation of FIG. 2.
Figure 14:
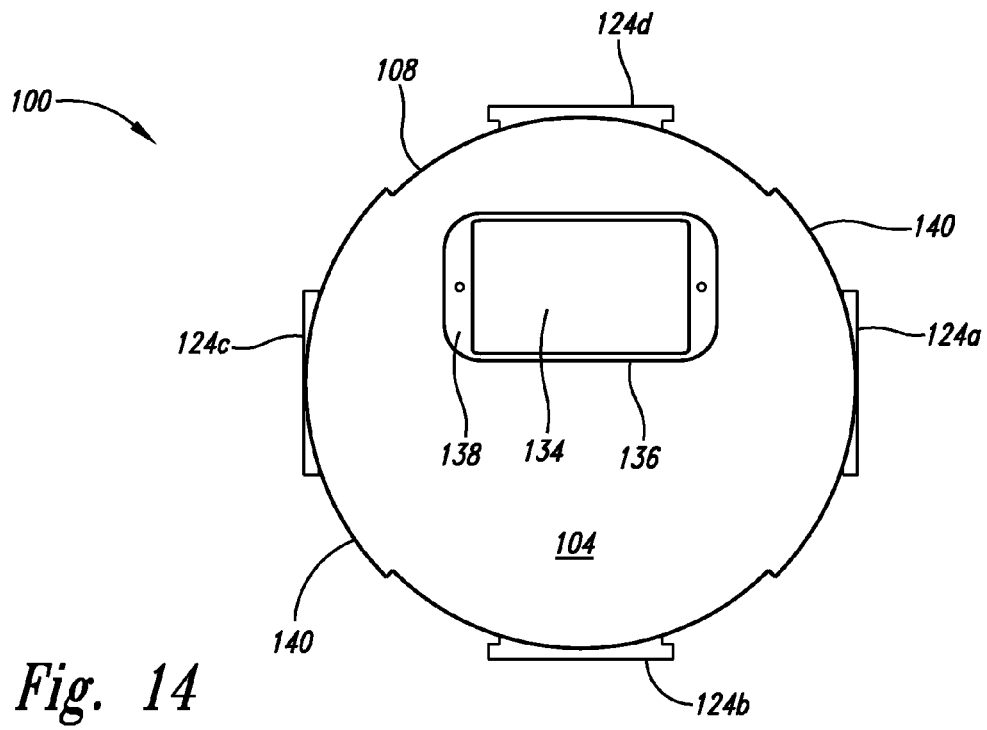
FIG. 14 is a front elevational view of the cable junction box with the front cover of FIG. 2 in a second orientation.
Figure 15:
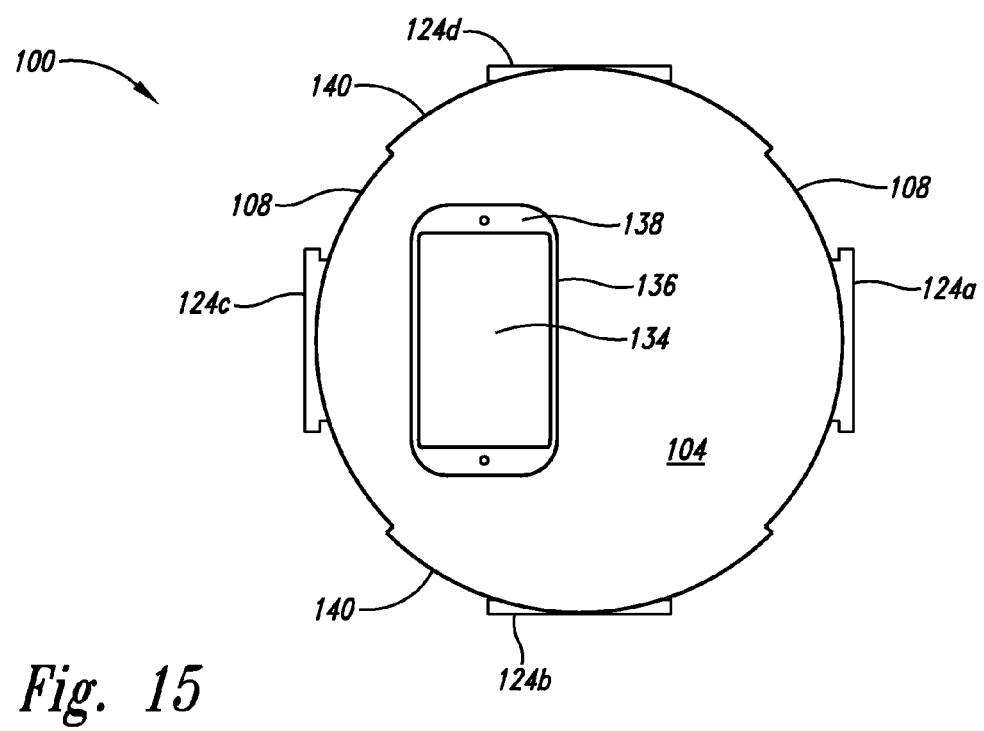
FIG. 15 is a front elevational view of the cable junction box with the front cover of FIG. 2 in a third orientation.
Figure 16:
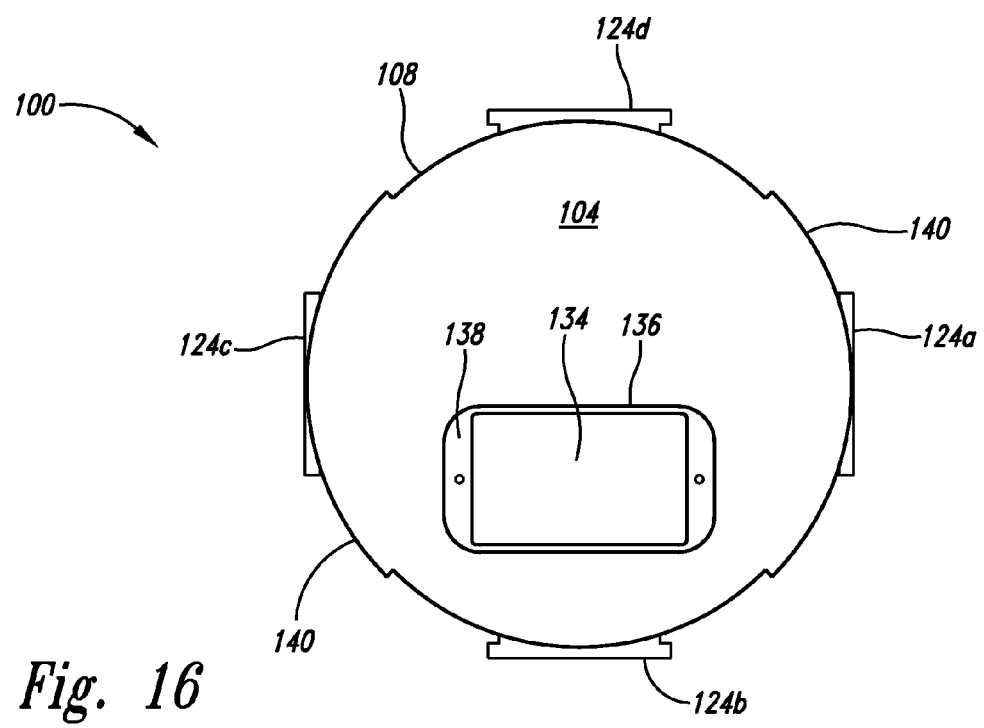
FIG. 16 is a front elevational view of the cable junction box with the front cover of FIG. 2 in a fourth orientation.

As discussed above, the front cover 104 can engage with different ones of the engagement slots 118 of the enclosure to position the front cover in different angular orientations relative to the enclosure 102. As shown in FIG. 13, the front cover 104 is positioned in the first front cover orientation. As shown in FIG. 14, the front cover 104 is positioned in a second front cover orientation. As shown in FIG. 15, the front cover 104 is positioned in a third front cover orientation. As shown in FIG. 16, the front cover 104 is positioned in a fourth front cover orientation.

Figure 17:
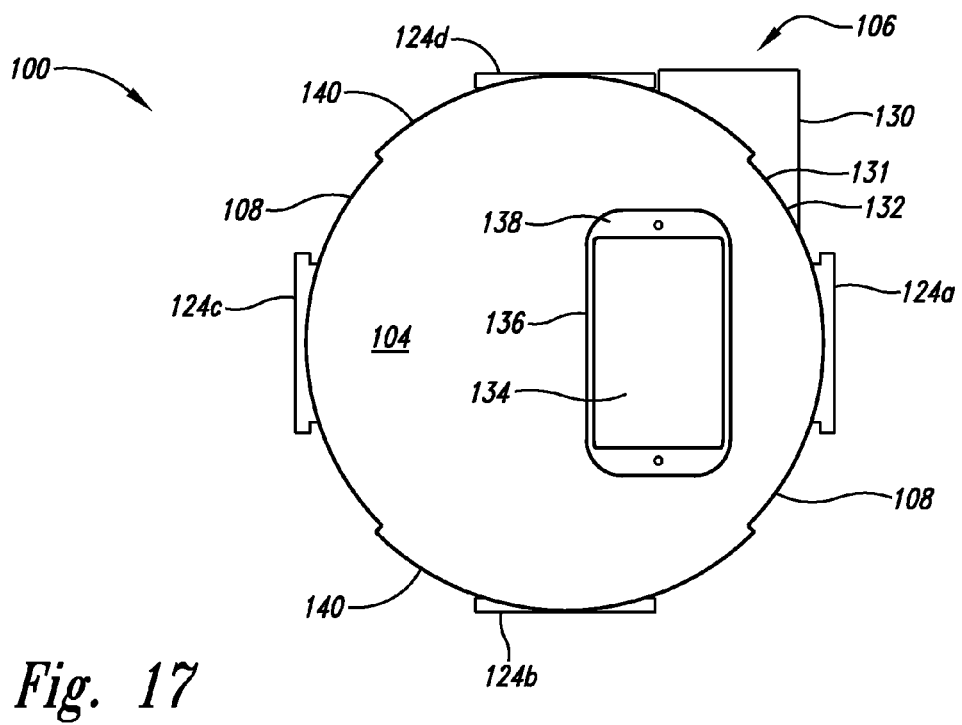
FIG. 17 is a front elevational view of the cable junction box with the cable inlet of FIG. 2 in the first orientation of FIG. 2.
Figure 18:
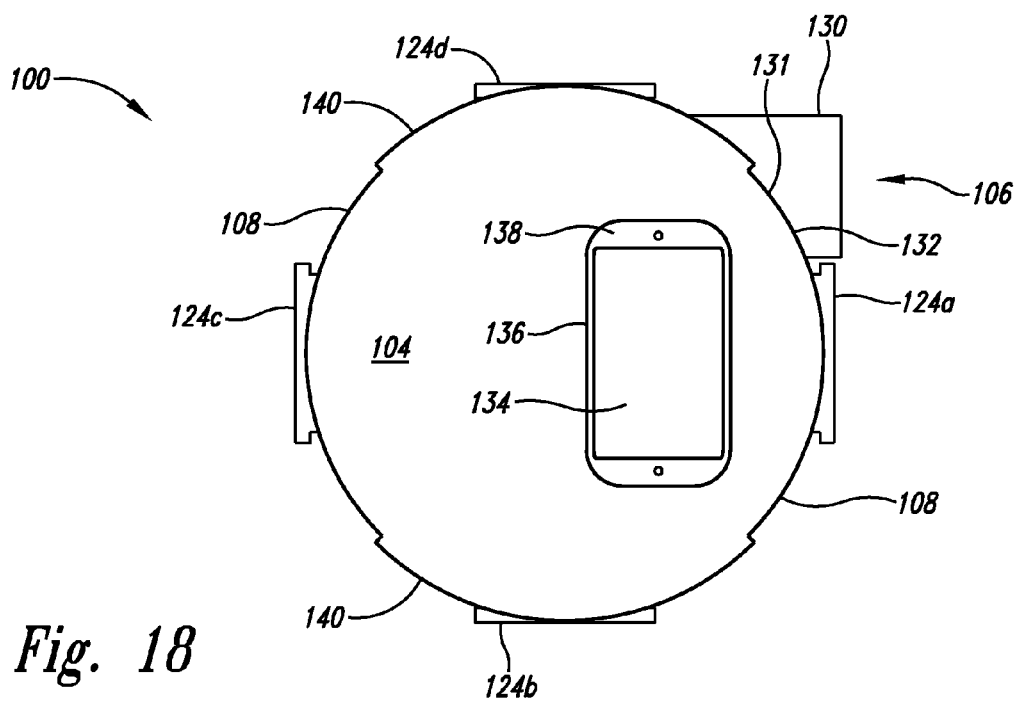
FIG. 18 is a front elevational view of the cable junction box with the cable inlet of FIG. 2 in a second orientation.
Figure 19:
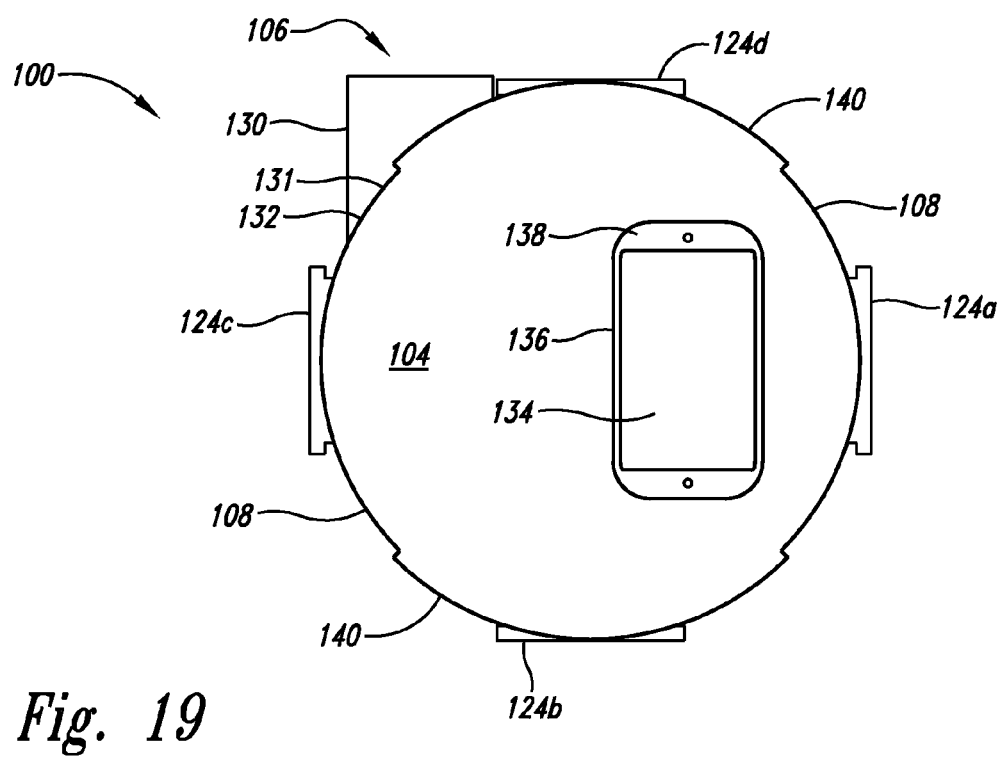
FIG. 19 is a front elevational view of the cable junction box with the cable inlet of FIG. 2 in a third orientation.
Figure 20:
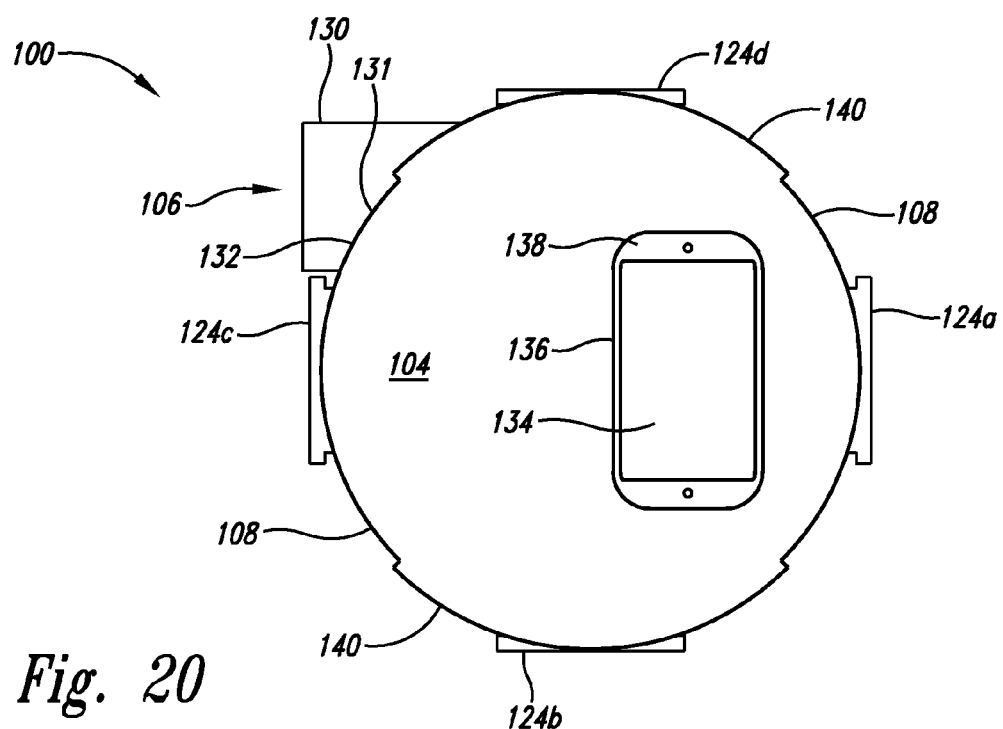
FIG. 20 is a front elevational view of the cable junction box with the cable inlet of FIG. 2 in a fourth orientation.

As discussed above the cable inlet 106 can engage with one of the openings 128a and 128b for different positional orientations of the cable inlet. As shown in FIG. 17, the cable inlet 106 is engaged with the opening 128a in a first cable inlet orientation with the cable guide duct 130 extending upward. As shown in FIG. 18, the cable inlet 106 is engaged with the opening 128a in a second cable inlet orientation with the guide duct 130 extending laterally to a first side of the enclosure 102 (right side as viewed in FIG. 18). As shown in FIG. 19, the cable inlet 106 is engaged with the opening 128b in a third cable inlet orientation with the guide duct 130 extending upward. As shown in FIG. 20, the cable inlet 106 is engaged with the opening 128b in a fourth cable inlet orientation with the guide duct 130 extending laterally to a second side of the enclosure 102 (left side as viewed in FIG. 20).

Figure 21:
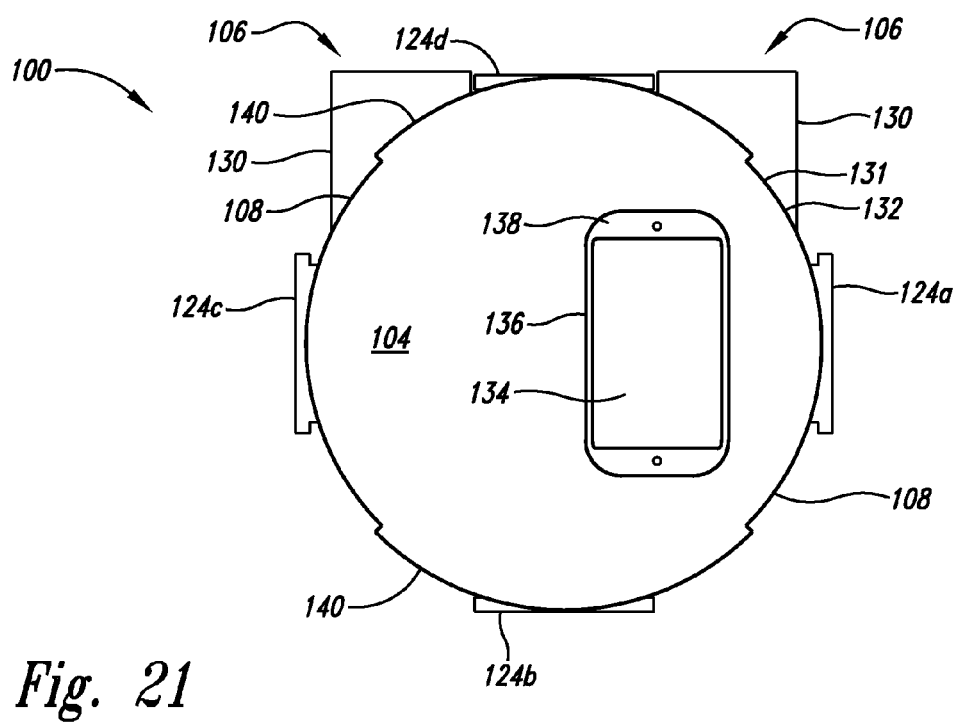
FIG. 21 is a front elevational view of the cable junction box of FIG. 2 with a first cable inlet in a first orientation and a second cable inlet in the third orientation.
Figure 22:
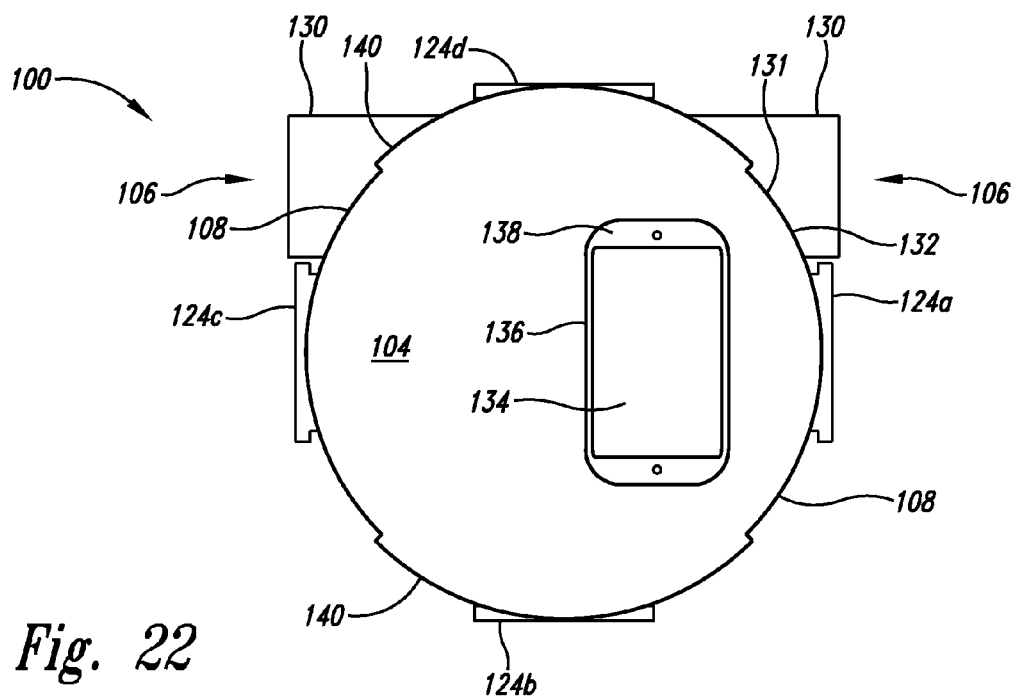
FIG. 22 is a front elevational view of the cable junction box of FIG. 2 with a first cable inlet in a second orientation and a second cable inlet in the fourth orientation.
Figure 23:
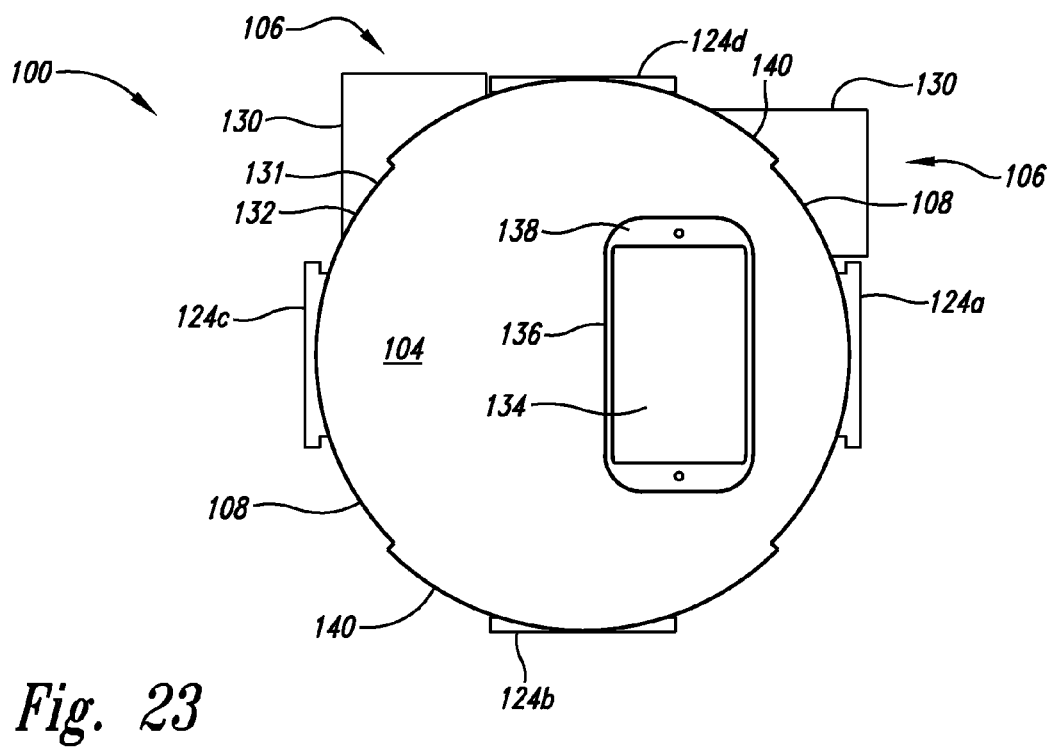
FIG. 23 is a front elevational view of the cable junction box of FIG. 2 with a first cable inlet in a second orientation and a second cable inlet in the third orientation.
Figure 24:
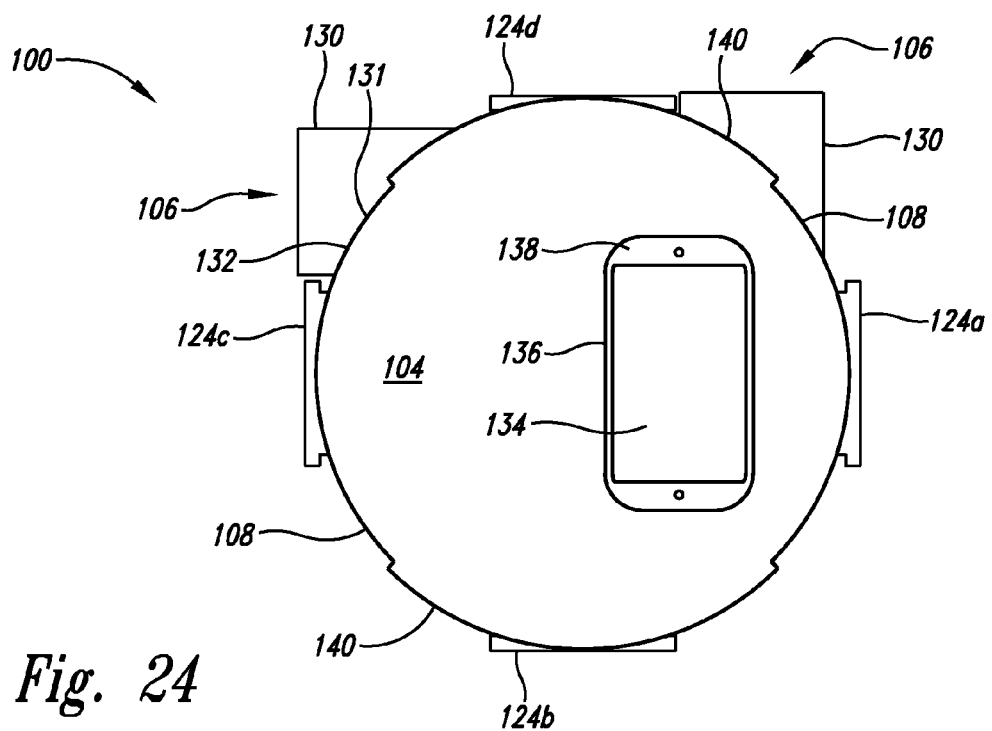
FIG. 24 is a front elevational view of the cable junction box of FIG. 2 with a first cable inlet in a first orientation and a second cable inlet in the fourth orientation.
Figure 25:
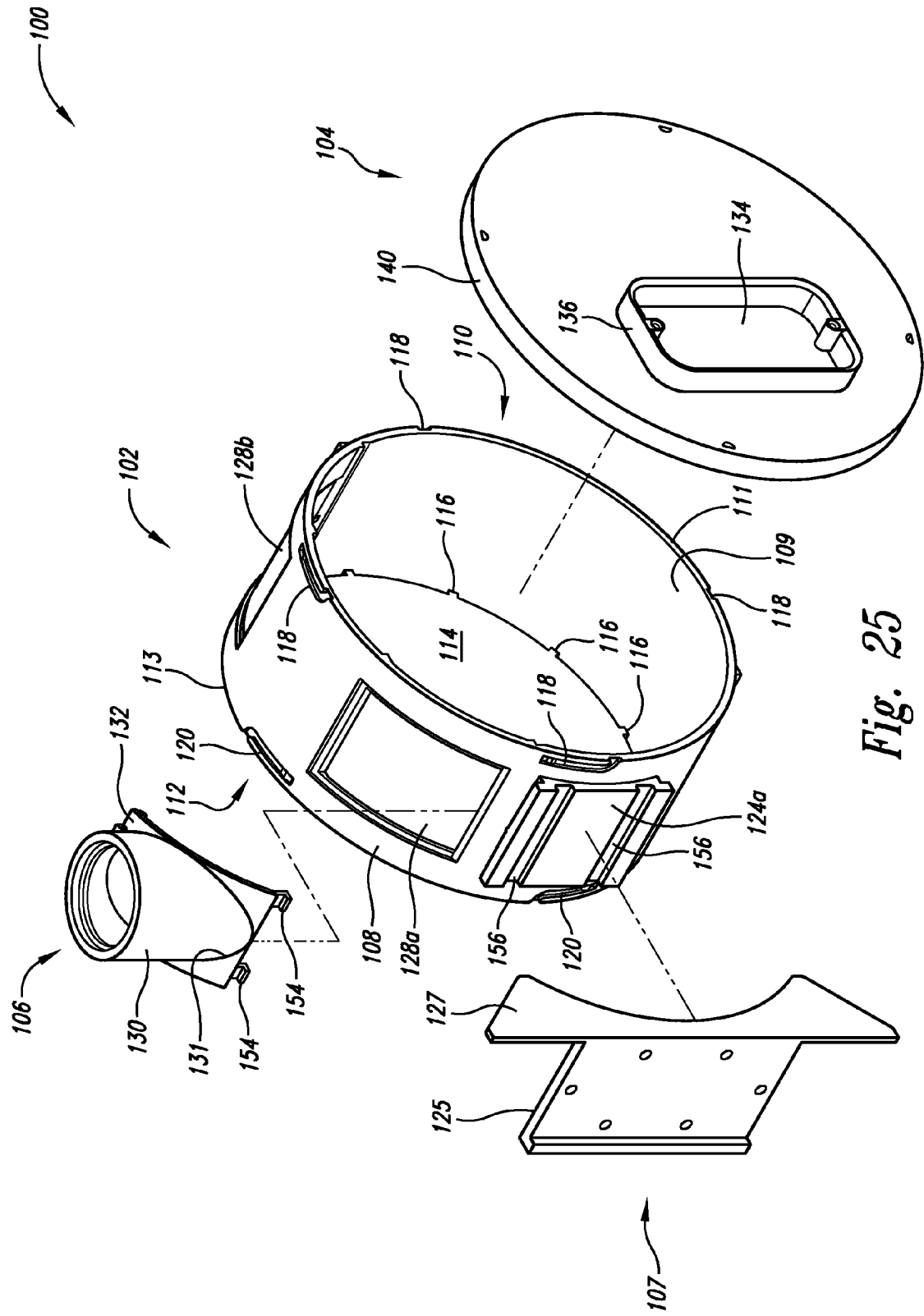
FIG. 25 is an exploded perspective view of a first alternative implementation of a cable junction box according to the present invention.
Figure 26:
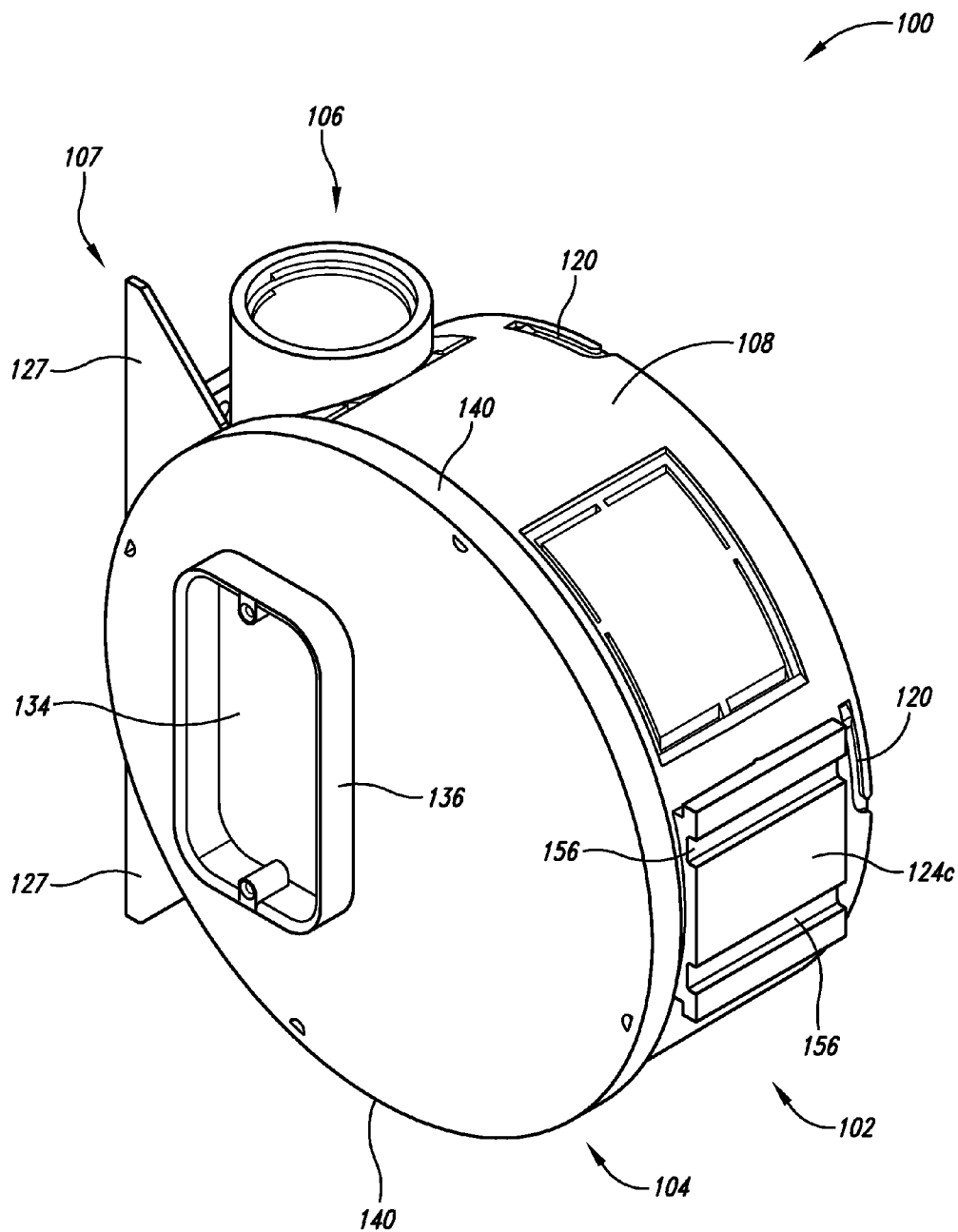
FIG. 26 is a right front perspective view of the cable junction box of FIG. 25.
Figure 27:
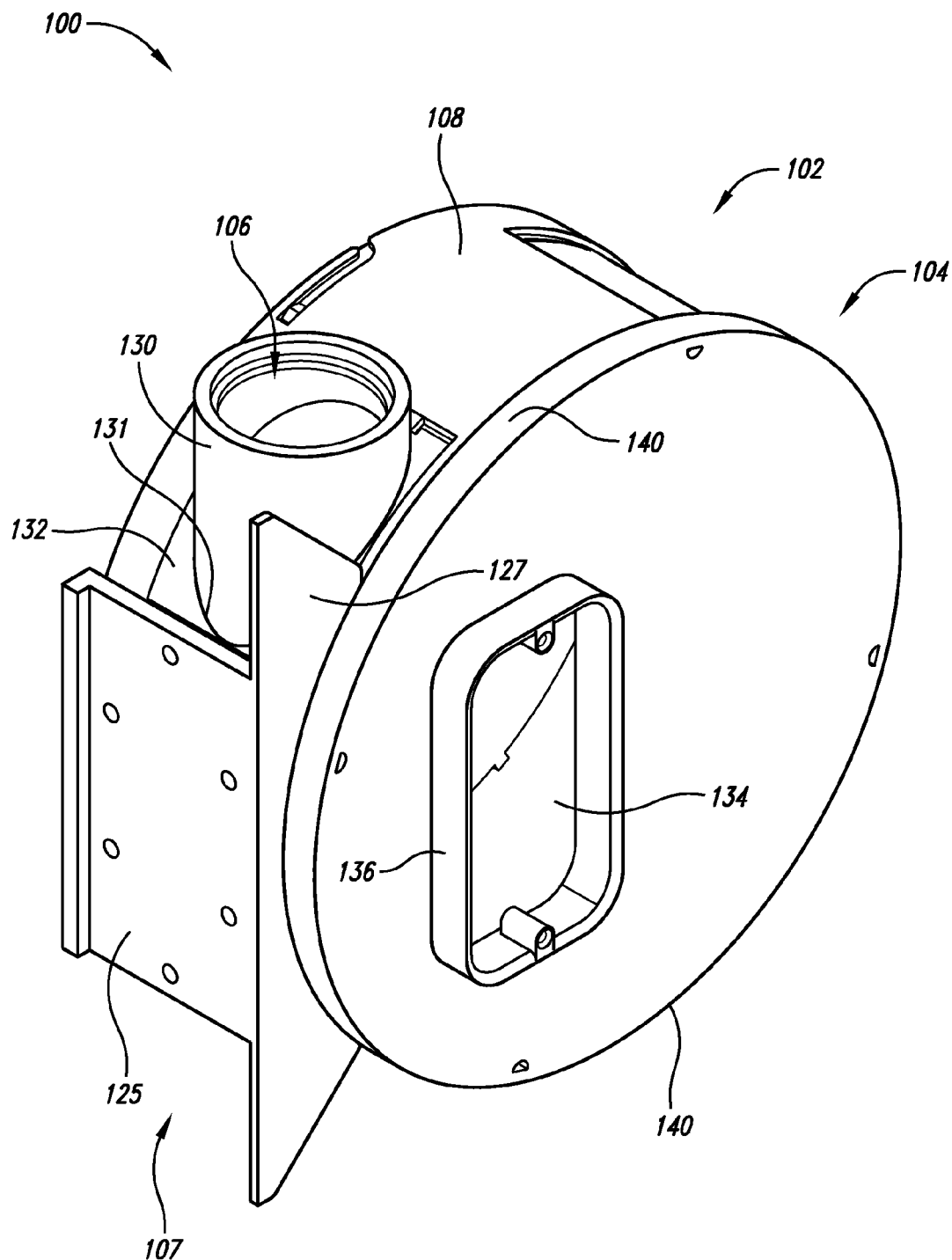
FIG. 27 is a left front perspective view of the cable junction box of FIG. 25.
Figure 28:
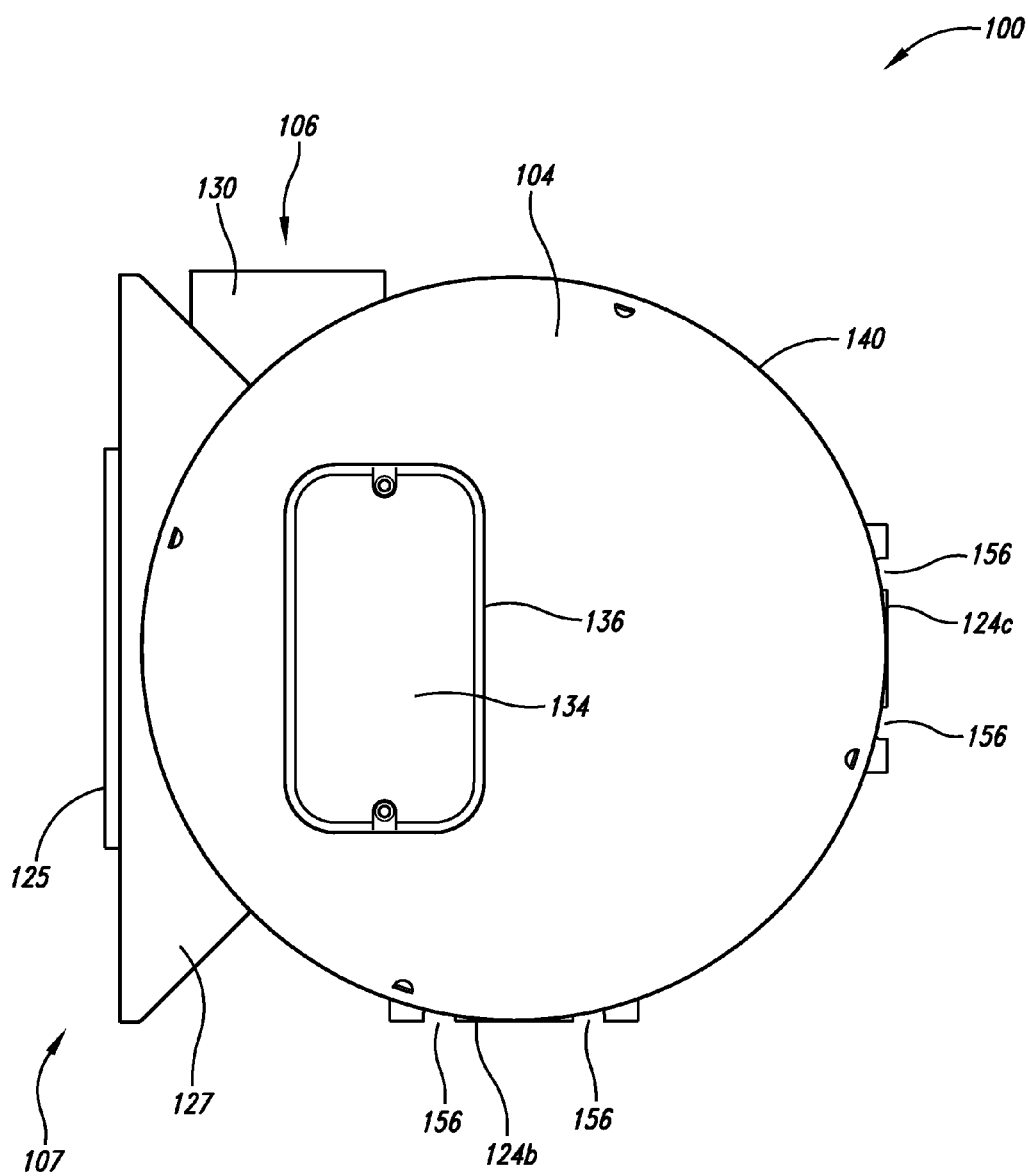
FIG. 28 is a front elevational view of the cable junction box of FIG. 25.
Figure 29:
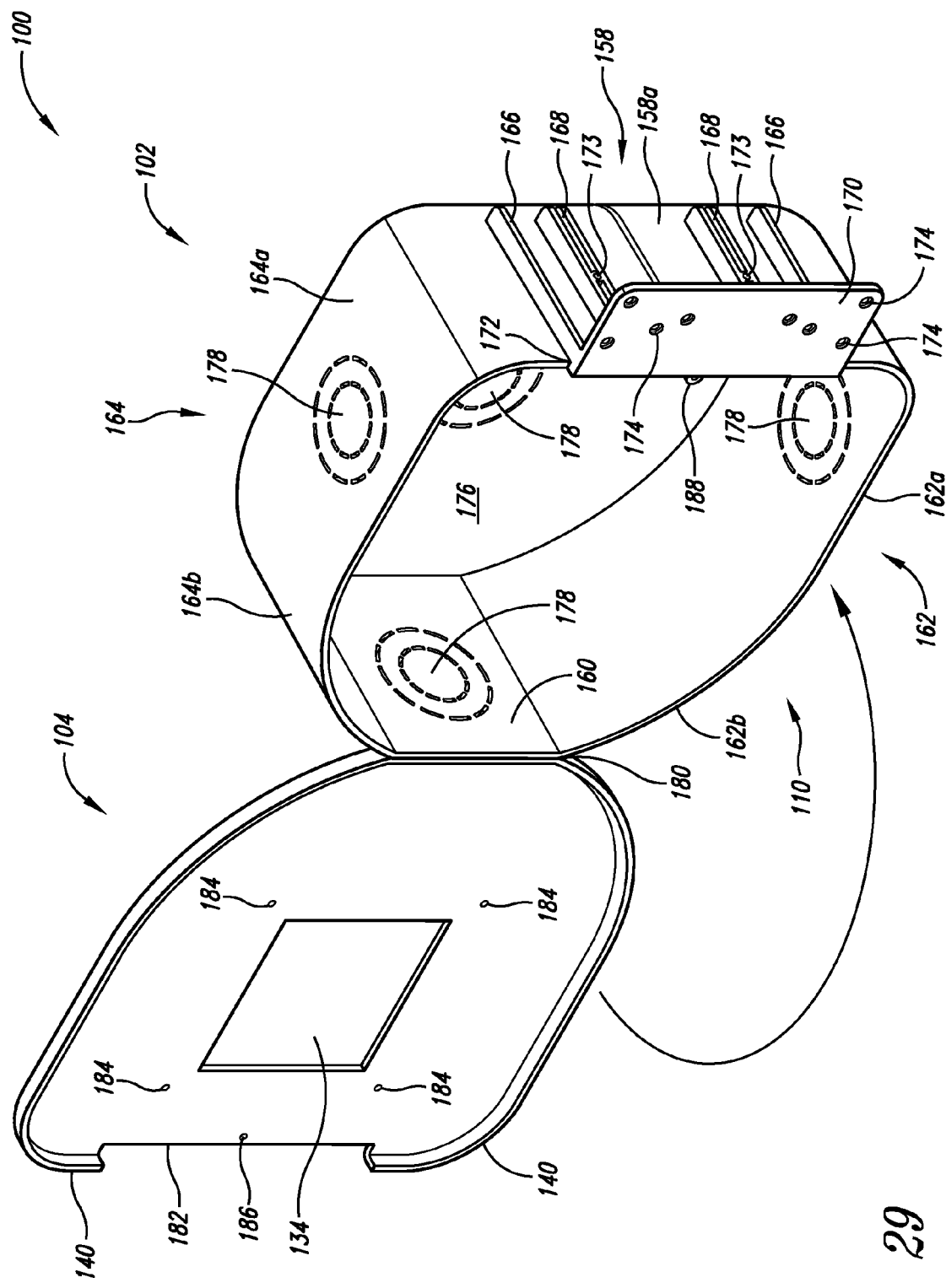
FIG. 29 is a right front perspective view of a second alternative implementation of the cable junction box of FIG. 25 with its front cover open.
Figure 30:
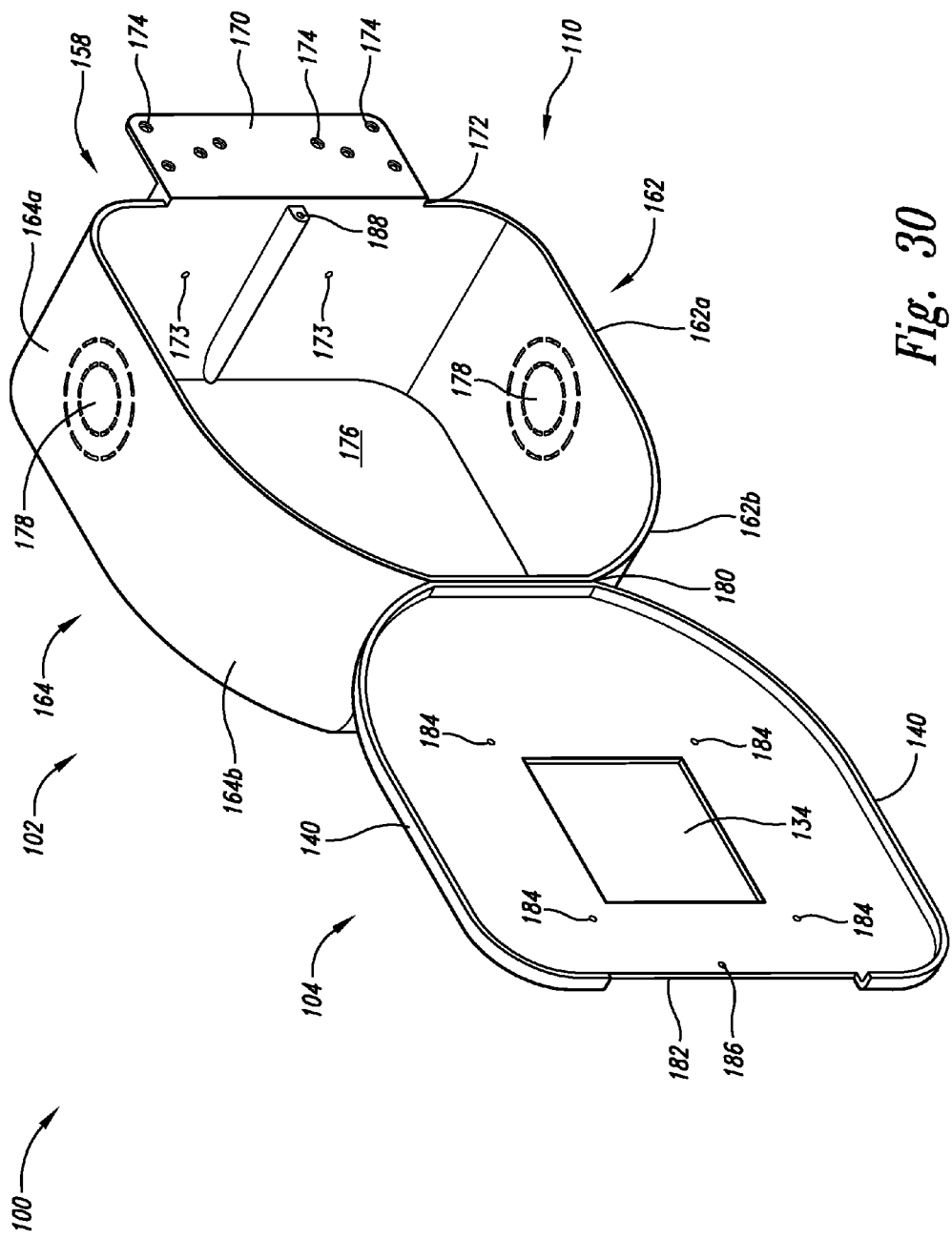
FIG. 30 is a left front perspective view of the cable junction box of FIG. 29.
Figure 31:
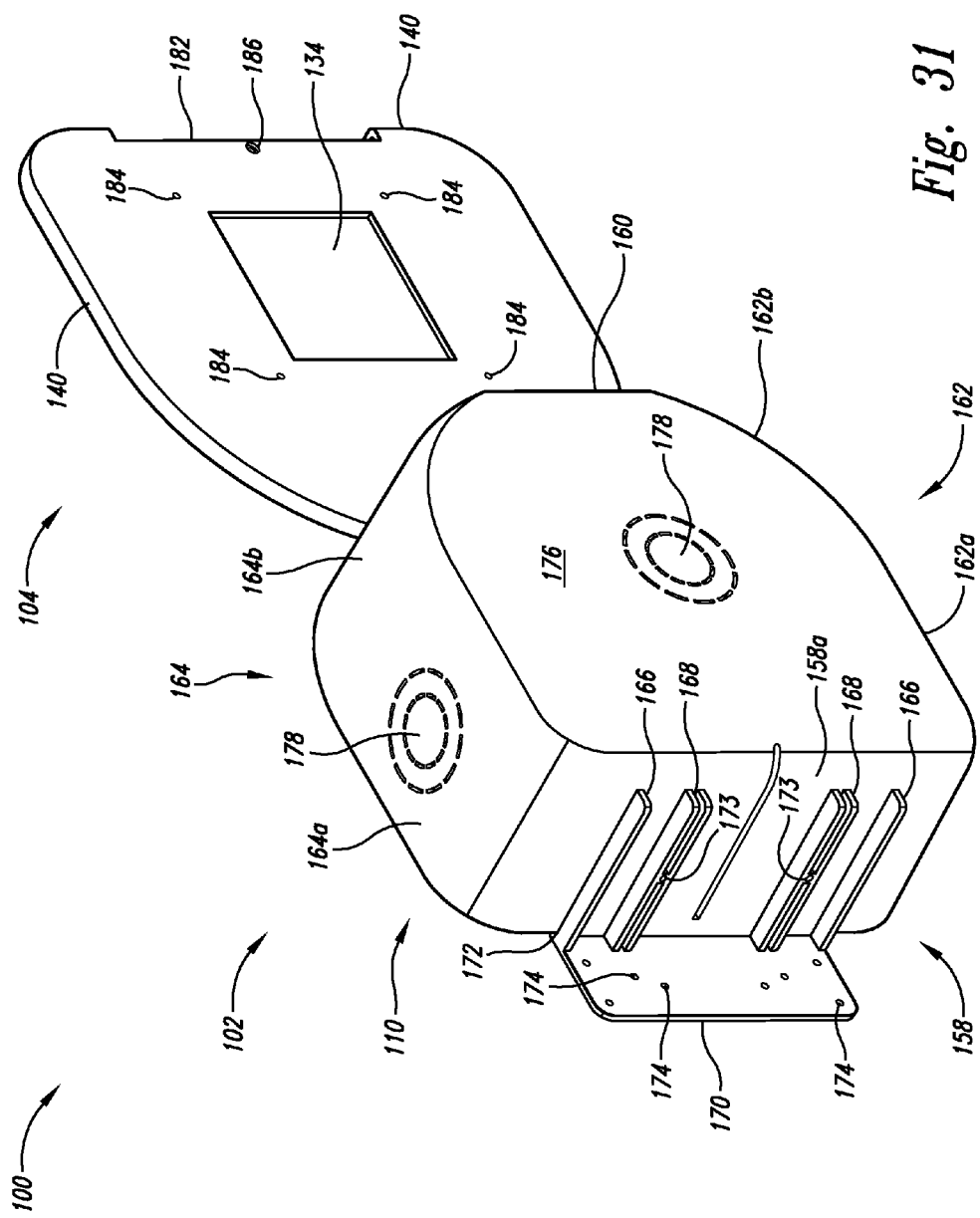
FIG. 31 is a right rear perspective view of the cable junction box of FIG. 29.
Figure 32:
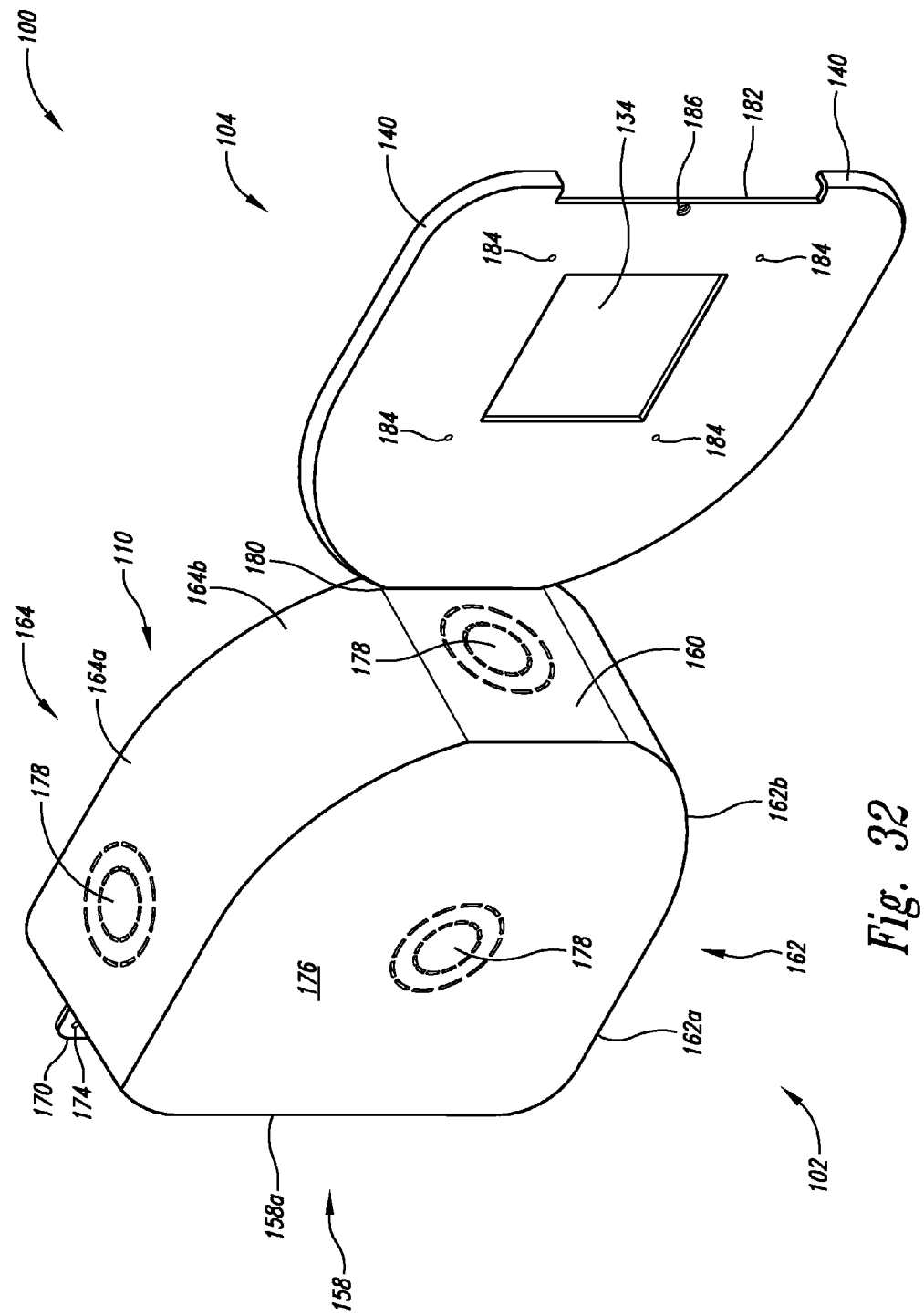
FIG. 32 is a left rear perspective view of the cable junction box of FIG. 29.
Figure 33:
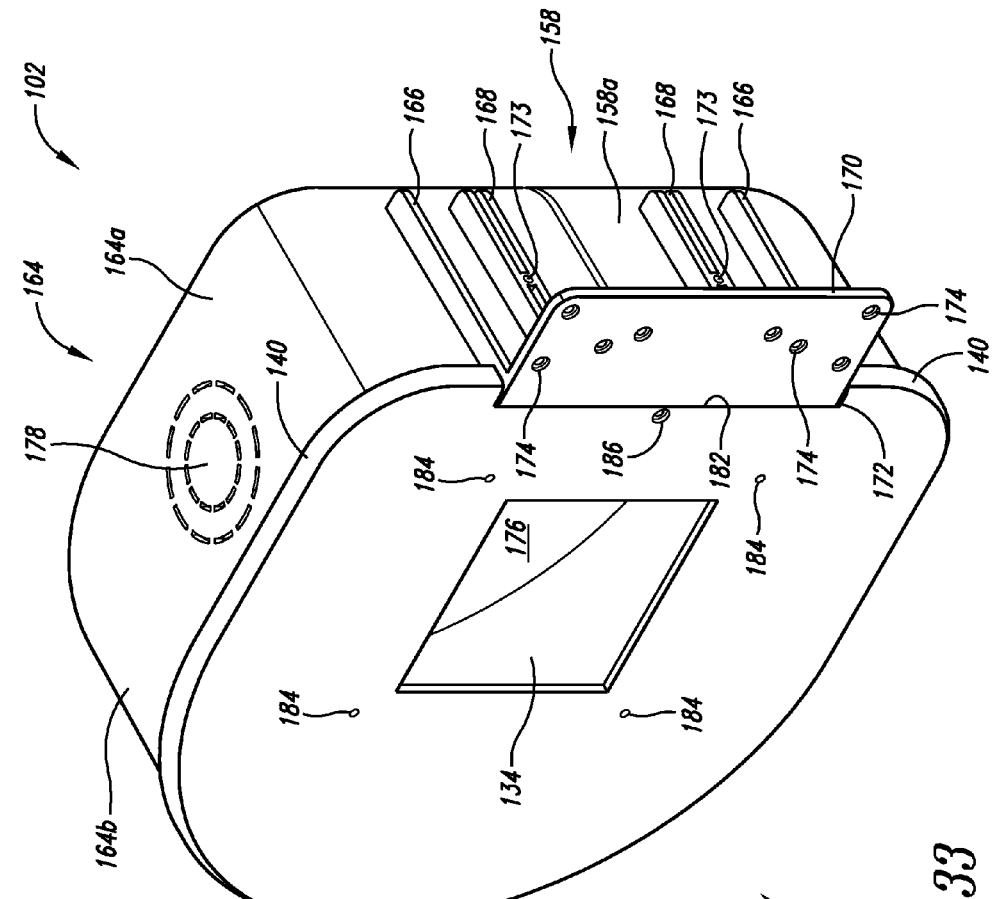
FIG. 33 is a front right side perspective view of the cable junction box of FIG. 29 with the front cover closed.
Figure 34:
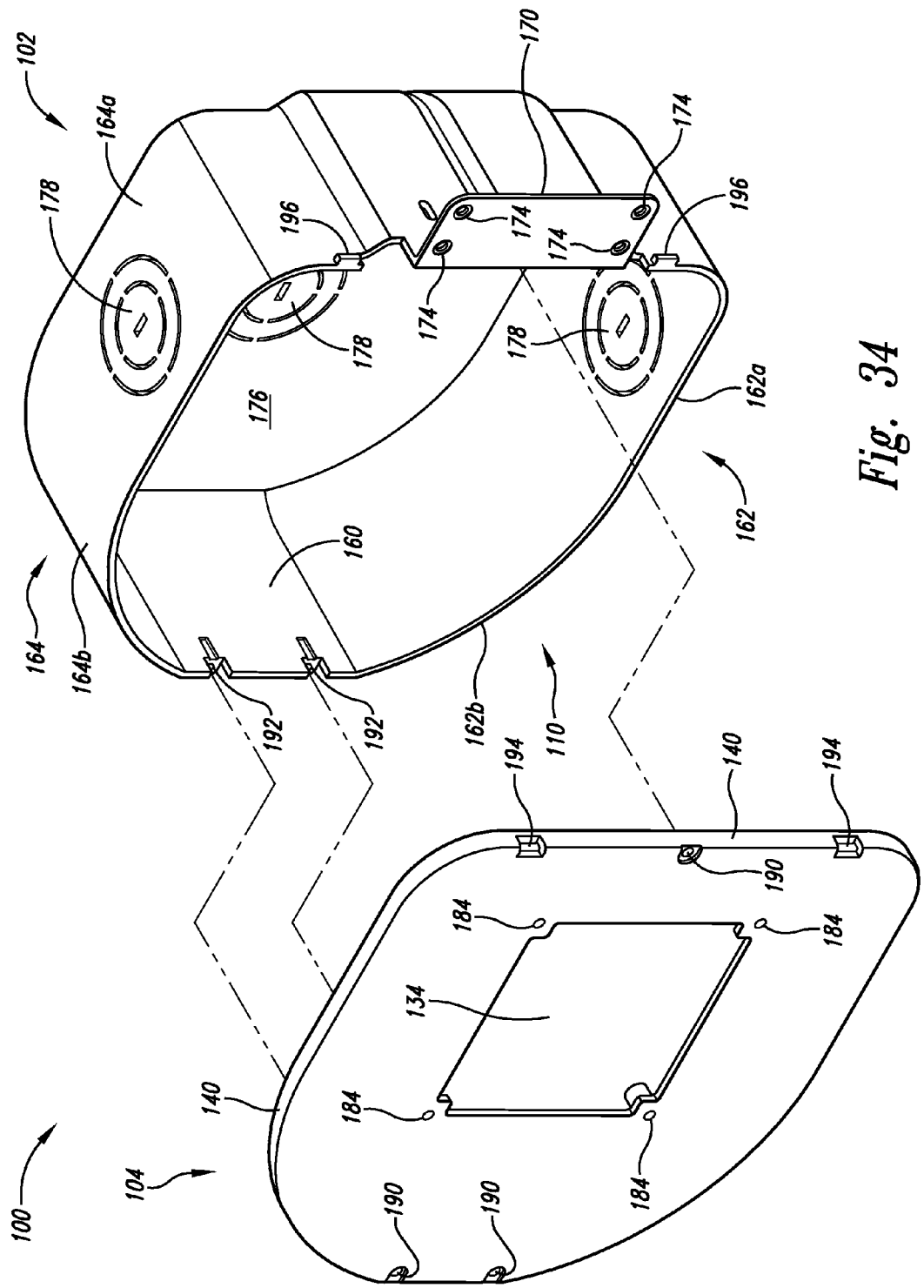
FIG. 34 is a right front perspective view of a third alternative implementation of the cable junction box with its front cover open.
Figure 35:
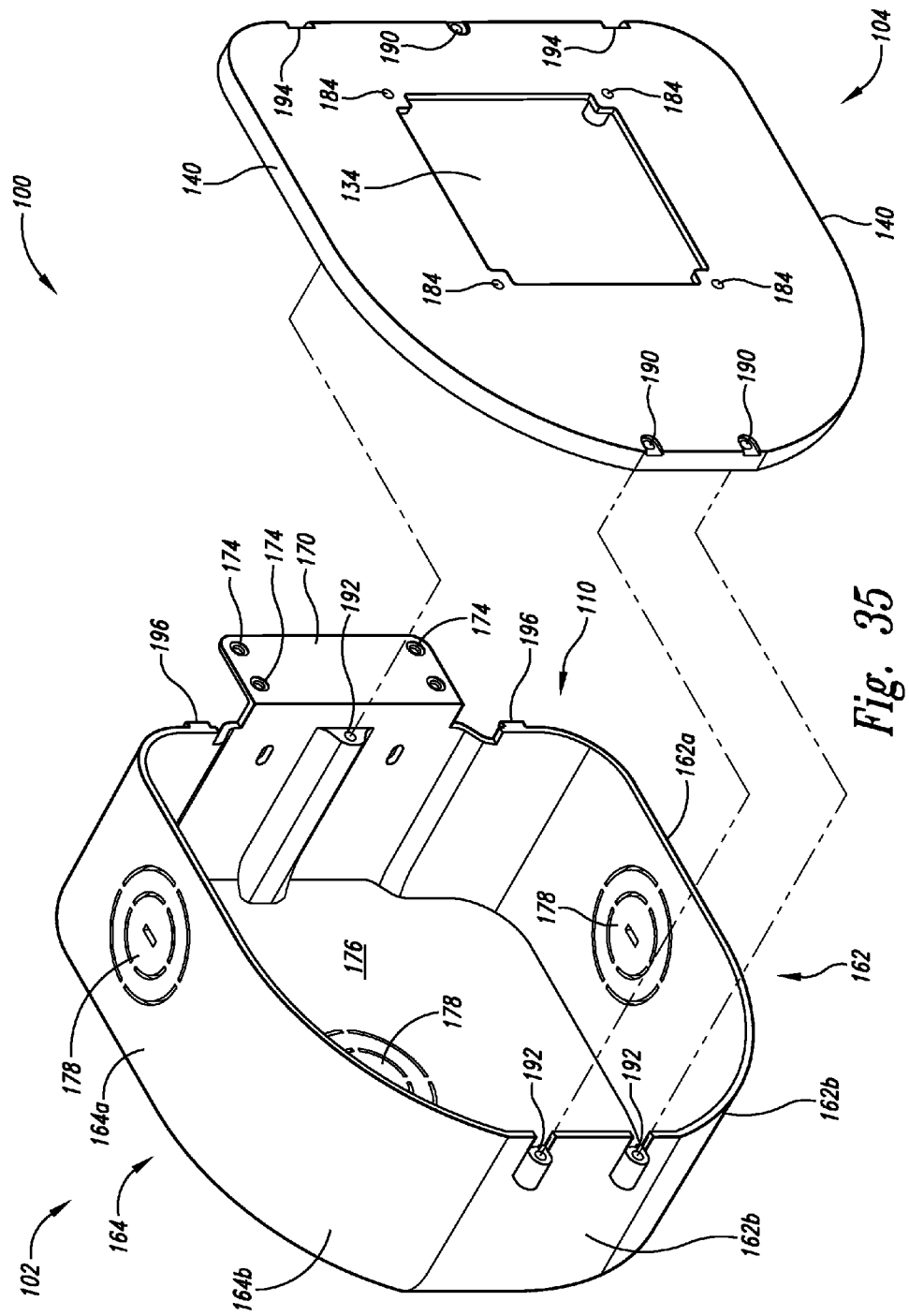
FIG. 35 is a left front perspective view of the cable junction box of FIG. 34.
Figure 36:
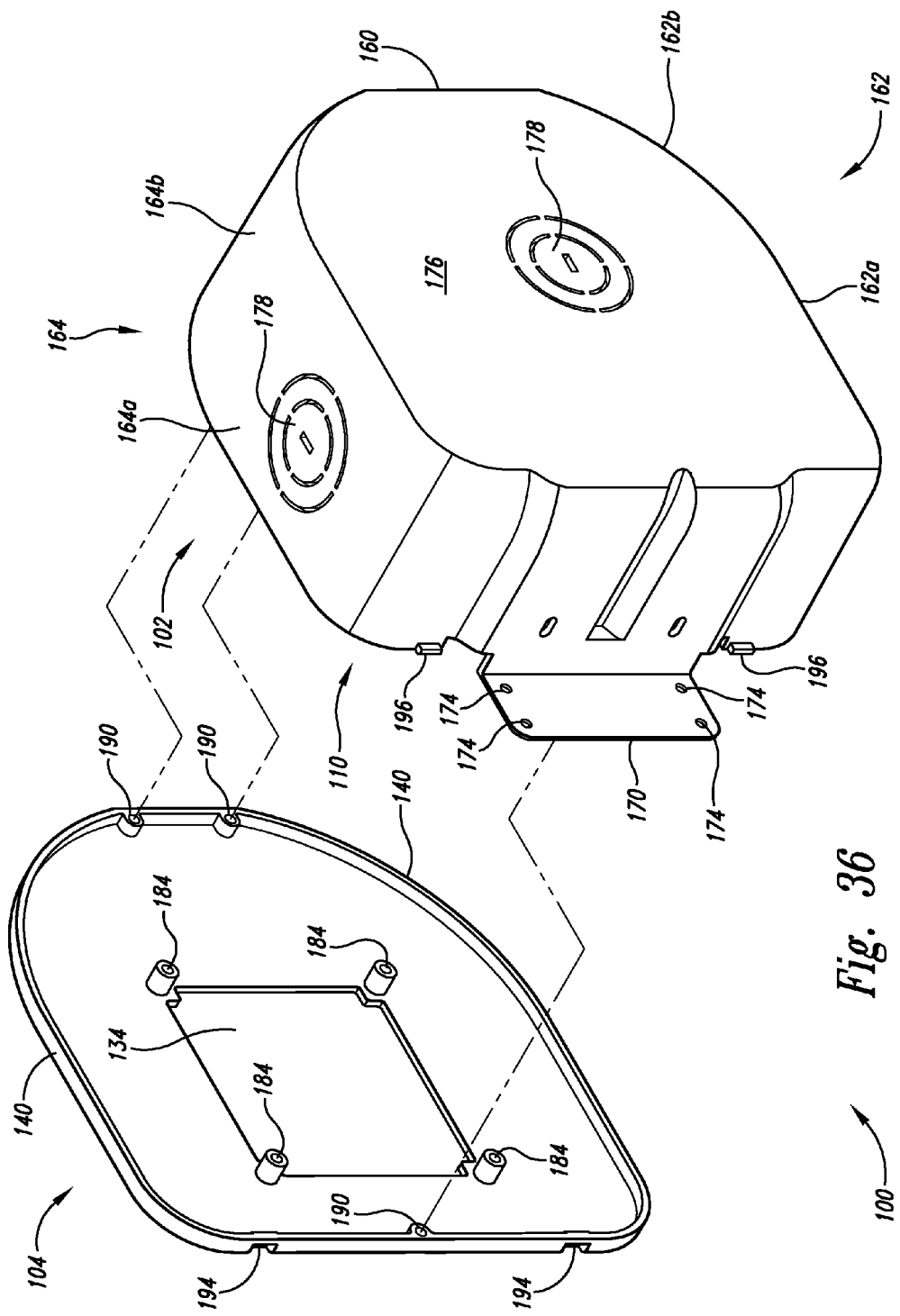
FIG. 36 is a right rear perspective view of the cable junction box of FIG. 34.
Figure 37:
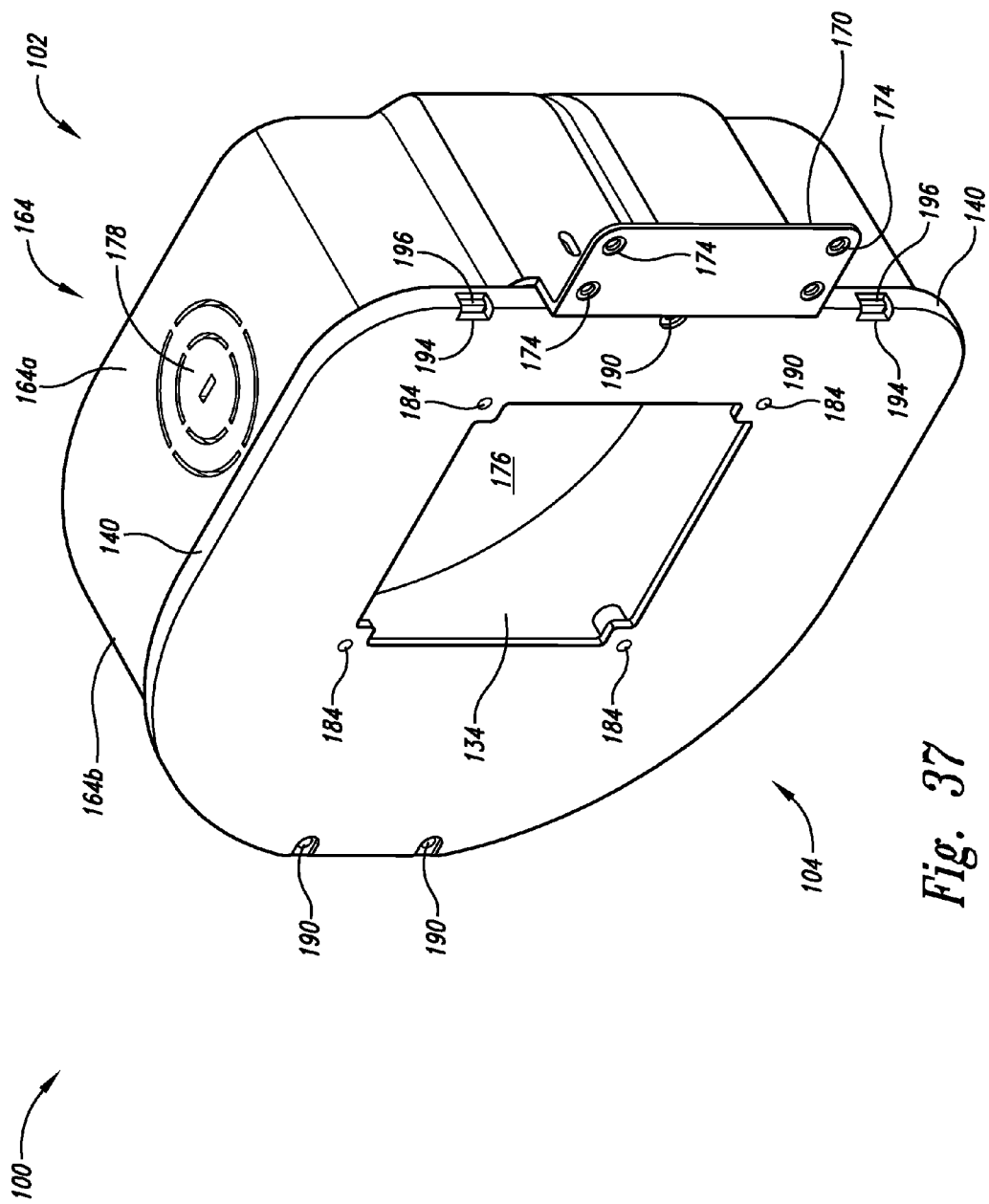
FIG. 37 is a front right side perspective view of the cable junction box of FIG. 34 with the front cover closed.

As shown in FIGS. 21-24, two of the guide ducts 130 can be each attached to a different one of the opening 128a and the opening 128b concurrently to provide a combination of two cable inlet orientations. A first combination of cable inlet orientations is shown in FIG. 21 as having one of the cable inlets 130 in the first cable inlet orientation and another one of the cable inlets in the third cable inlet orientation. A second combination of cable inlet orientations is shown in FIG. 22 as having one of the cable inlets 130 in the second cable inlet orientation and another one of the cable inlets in the fourth cable inlet orientation. A third combination of cable inlet orientations is shown in FIG. 23 as having one of the cable inlets 130 in the second cable inlet orientation and another one of the cable inlets in the third cable inlet orientation. A fourth combination of cable inlet orientations is shown in FIG. 24 as having one of the cable inlets 130 in the first cable inlet orientation and another one of the cable inlets in the fourth cable inlet orientation.

A first alternative implementation of the cable junction box 100 is shown in FIGS. 25-28 without the attachment plate 124d, and alternative versions of the cable inlet 106, the attachment plates 124, the brace member 127, and the lip members 140. In this first alternative implementation, the cable inlet 106 has clip members 154 to assist in securely attaching the cable inlet 106 to the peripheral portion 108 of the enclosure 102. The attachment plates 124 have outward facing groves 156 to assist with coupling with the mounting bracket 107. The lip members 140 of the front cover 104 fully extend as one piece around the circumference of the front cover to allow for coupling with all of the engagement slots 118 on the first face 110.

A second alternative implementation of the cable junction box 100 is shown in FIGS. 29-33 as having the enclosure 102 with lateral a first wall 158 and a lateral second wall 160 spaced apart from the first side wall. A forward third wall 162 and a rearward fourth wall 164 are spaced apart from one another and each extend between the first wall 158 and the second wall 160. The first wall 158 has a first portion 158a that is substantially flat with externally protruding first ribs 166 and second ribs 168. A bracket member 170 extends from a side 172 of the first portion 158a away from the first face 110 of the enclosure 102 and substantially normal to the first portion 158a of the first wall 158. The second ribs 168 have apertures 173, and the bracket member 170 has apertures 174 to receive fasteners, such as screws or nails, to affix the enclosure 102 to one or more building structure members such as a wall stud and/or a wall.

The third wall 162 has a first portion 162a extending from the first wall 158 that is substantially flat and a second portion 162b extending from the second wall 160 that is substantially curved afforded by the smaller size of the second wall compared with the first wall. Similarly, the fourth wall 164 has a first portion 164a extending from the first wall 158 that is substantially flat and a second portion 164b extending from the second wall 160 that is substantially curved also afforded by the smaller size of the second wall compared with the first wall. The second portion 162b of the third wall 162 and the second portion 164b of the fourth wall 164 are shaped to define in combination a curvature with a radius at least as large as the minimum radius of curvature for a selected communication cable to be used in the enclosure 102 to facilitate coiling a portion of the communication cable.

The enclosure 102 further includes a rear wall 176 that is affixed with the first wall 158, the second wall 160, the third wall 162, and the fourth wall 164. A perforated portion 178 is located along each of the second wall 160, the first portion 162a of the third wall 162, the first portion 164a of the fourth wall 164 and the rear wall 176. Each of the perforated portions 178 allow for removal of a portion of wall material to provide an aperture for cable access into and/or out of the enclosure 102.

In the second alternative implementation, the front cover 104 is coupled to a first side 180 of the second wall 160 through a one-piece construction of the front cover with the second wall to form an integral hinge. The lip members 140 extend as one piece around the front cover 104 with a cut out section 182 to accommodate the bracket member 170 when the front cover is closed. The opening 134 of the front cover 134 is sized to receive a larger receptacle such as a four outlet receptacle, mounted by fasteners received through apertures 184 in the front cover. The front cover 104 is secured to the enclosure 102 with a fastener received through an aperture

186 in the front cover and through an aperture 188 located along the side 172 of the first wall 158.

A third alternative implementation of the cable junction box 100 is shown in FIGS. 34-37 as having screw holes 190 of the front cover 104 to each accompany of different one of screw holes 192 of the enclosure 102 to receive screws for fastening of the front cover with the enclosure. Furthermore, slotted apertures 194 are positioned on the front cover 104 to engage with tabs 196 on the enclosure 102 for further fastening of the front cover with the enclosure.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. For a cable having a minimum bend radius, a junction box comprising an enclosure installable behind a wall the enclosure being configured to be adjacent to a portion of the wall having an opening when the enclosure is installed behind the wall, the enclosure comprising:
   a hollow interior portion having a hidden portion extending behind a portion of the wall adjacent the opening in the wall, the hidden portion being defined at least in part by a curved interior surface portion having a radius of curvature at least as great as the minimum bend radius of the cable, the hollow interior portion being configured to store at least one coil of the cable with at least a portion of the at least one coil of the cable being stored in the hidden portion of the hollow interior portion; and
   an inlet aperture adjacent the opening in the wall and in communication with the hollow interior portion of the enclosure, the inlet aperture being configured such that a portion of the cable is insertable into and removable from the hollow interior portion through the inlet aperture and the opening in the wall, the curved interior surface portion positioned with respect to the inlet aperture to receive a portion of the cable inserted through the inlet aperture to lie adjacent the curved interior surface.

2. The junction box of claim 1 for use with a building structure member located behind the wall, the junction box further including a bracket member couplable to the building structure member to affix the enclosure to the building structure member.

3. The junction box of claim 1 for use with a building structure member located behind the wall, the junction box further including:
   a mounting bracket removably coupled to the enclosure to affix the enclosure to the building structure member; and
   an attachment plate externally positioned on the enclosure to slidably couple with the mounting bracket.

4. The junction box of claim 3 wherein the mounting bracket has first and second rail members spaced apart to slidably receive the mounting bracket therebetween.

5. The junction box of claim 1 for use with a building structure member located behind the wall, the junction box further including a mounting bracket, and wherein the enclosure includes a first attachment plate shaped and sized to removably couple to the mounting bracket, the mounting bracket shaped and sized to couple to the building structure member.

6. The junction box of claim 5 wherein the enclosure further includes a second attachment plate shaped and sized to removably couple to the mounting bracket for selective coupling of the mounting bracket with one of the first and second attachment plates.

7. The junction box of claim 1 wherein at least a portion of the enclosure is substantially cylindrical.

8. The junction box of claim 1 further including a front cover, and wherein the enclosure is configured to removably engage with the front cover.

9. The junction box of claim 8 wherein the enclosure has engagement slots to removably engage with the front cover.

10. The junction box of claim 1 for use with a receptacle, the junction box further including a front cover, the inlet aperture being located in the front cover and sized and shaped for mounting the receptacle thereat.

11. The junction box of claim 10 further including a mud ring bordering the inlet aperture and extending outward from the front cover.

12. The junction box of claim 11 further including a rear wall, the rear wall being positioned opposingly spaced apart from the front cover.

13. The junction box of claim 1 further including a cable inlet having a guide duct and a flange extending from an end portion of the guide duct, and wherein the enclosure has a peripheral portion with an opening, the flange sized and shaped to couple with the enclosure at the opening to allow communication between the guide duct and the opening.

14. The junction box of claim 13 wherein the flange is sized and shaped to be placed into the opening in at least two selectable orientations selectively to face the guide duct in one of at least two different directions.

15. The junction box of claim 13 wherein the peripheral portion of the enclosure has a second opening and the flange of the cable inlet is sized and shaped to couple with the enclosure at the second opening in at least two selectable orientations to selectively position the guide duct of the second cable inlet in one of at least two different directions.

16. The junction box of claim 13 wherein at least a portion of the guide duct is a cylindrical tube.

17. The junction box of claim 1 wherein the enclosure has a first wall, a second wall, a third wall, and a fourth wall, the first wall having a substantially flat portion, the second wall having a substantially flat portion, the second wall being spaced apart from the first wall, the second wall being smaller than the first wall, the third wall extending between the first wall and the second wall, the third wall having a curved portion with a radius of curvature at least as great as the minimum bend radius of the cable, the fourth wall extending between the first wall and the second wall, the fourth wall having a curved portion with a radius of curvature at least as great as the minimum bend radius of the cable.

18. The junction box of claim 17 wherein the enclosure has wall perforations defining a wall portion removable to create a wall aperture.

19. The junction box of claim 17 further including a plurality of ribs extending externally from the first wall.

20. The junction box of claim 17 further including a bracket member extending from the first wall.

21. The junction box of claim 17 further including a front cover pivotally coupled to the second wall.

22. The junction box of claim 21 wherein the front cover is pivotally coupled to the second wall with an integral hinge with the first cover and the second wall formed as one piece.

23. The junction box of claim 1 for use with a receptacle, wherein the inlet aperture is sized and shaped for mounting the receptacle thereat.

24. The junction box of claim 1 for use with a receptacle connected to one end of the portion of the at least one coil of the cable stored inside the enclosure, wherein the inlet aperture is sized and shaped for mounting the receptacle thereat, the receptacle being removably couplable to the enclosure, when uncoupled from the enclosure, the receptacle being movable way from the inlet aperture to pull at least a portion of the cable of the at least one coil of the cable from the interior portion through the inlet aperture.

25. For a cable having a minimum bend radius, a junction box comprising an enclosure installable behind a wall having an opening with a first cross-sectional area, the enclosure comprising:
   an inlet aperture adjacent the opening of the wall, the inlet aperture having a second cross-sectional area;
   a first wall;
   a second wall;
   a third wall; and
   a fourth wall, the first wall having a substantially flat portion, the second wall having a substantially flat portion, the second wall being spaced apart from the first wall, the second wall being smaller than the first wall, the third wall extending between the first wall and the second wall, the third wall having a curved portion with a radius of curvature at least as great as the minimum bend radius of the cable, the fourth wall extending between the first wall and the second wall, the fourth wall having a curved portion with a radius of curvature at least as great as the minimum bend radius of the cable, a third cross-sectional area being defined between the first, second, third, and fourth walls, the third cross-sectional area being greater than the first and second cross-sectional areas.

26. The junction box of claim 25, wherein the first, second, third, and fourth walls form a periphery of an opening, and the junction box further comprises:
   a cover member having a surface, the cover member configured to engage with the first, second, third, and fourth walls and shaped to enclose the opening, the cover member being positioned behind the opening in the wall and too large to pass therethrough, the inlet aperture being formed in the cover member and bounded by an outward protrusion extending from the surface of the cover; and
   a wall plate bracket configured to engage with a wall plate, the wall plate bracket being located at the outward protrusion.

27. The junction box of claim 25, wherein the substantially flat portion of the second wall further comprises a removable perforated portion sized such that when removed, an aperture is provided through which the cable may be inserted into the enclosure.

28. The junction box of claim 25, wherein the third wall has a substantially flat portion and a removable perforated portion formed in the substantially flat portion, the removable perforated portion being sized such that when the removable perforated portion is removed, an aperture is provided through which the cable may be inserted into the enclosure.

29. The junction box of claim 25, wherein the fourth wall has a substantially flat portion and a removable perforated portion formed in the substantially flat portion, the removable perforated portion being sized such that when the removable perforated portion is removed, an aperture is provided through which the cable may be inserted into the enclosure.

30. The junction box of claim 25, wherein the enclosure further comprises a rear wall extending between the first, second, third, and fourth walls, the rear wall having a removable perforated portion sized such that when removed, an aperture is provided through which the cable may be inserted into the enclosure.

31. The junction box of claim 25 for use with a wall plate, wherein the enclosure further comprises a front cover pivotably connected to the substantially flat portion of the second wall, the inlet aperture being formed in the front cover and sized and shaped for mounting the wall plate thereat.

32. The junction box of claim 25 for use with a building structure member, wherein the substantially flat portion of the first wall further comprises a plurality of outwardly extending ribs configured to receive fasteners operable to fasten the junction box to the building structure member.

33. The junction box of claim 25 for use with a building structure member, the junction box further comprising a bracket member configured to couple the enclosure to the building structure member.

34. The junction box of claim 33, wherein the bracket member is substantially orthogonal to and extends away from the substantially flat portion of the first wall.

35. A method for use with a cable having an end portion and a minimum bend radius, the method comprising:
   mounting an enclosure to a wall stud, the enclosure having an inlet aperture into an interior space at least partially defined by a curved interior surface portion having a radius of curvature at least as great as the minimum bend radius of the cable, the enclosure further comprising an enclosure opening into the interior space spaced apart from the inlet aperture;
   inserting the end portion of the cable into the interior space through the enclosure opening, positioning a first portion of the end portion of the cable along the curved interior surface portion to form a curved portion of cable having an actual radius of curvature at least as great as the minimum bend radius of the cable, and positioning a second portion of the end portion of the cable inside the inlet aperture to position a third portion of the end portion of the cable outside the interior space of the enclosure; and
   covering the enclosure with a wall having a wall opening formed therein, the inlet aperture being aligned with the wall opening, a covered portion of the interior space being spaced outwardly from the inlet aperture and positioned behind a portion of the wall adjacent the wall opening.

36. The method of claim 35, wherein mounting the enclosure to the wall stud further comprises affixing the enclosure to the wall stud with a mounting bracket.

37. The method of claim 36, further comprising: removably and slidably coupling the mounting bracket to the enclosure.

38. The method of claim 35 the wherein the enclosure has a substantially cylindrical interior space.

39. A junction box for installation behind a wall panel and for storing a service loop of cable behind the wall panel, the service loop being temporarily extendable from the junction box behind the wall panel through an opening defined by a portion of the wall panel, the junction box comprising:
   a volume extending outwardly from the opening along the wall panel in at least one direction to space a hidden portion of the volume from the opening, the hidden portion being adjacent to and covered by the portion of the wall panel defining the opening, the hidden portion of the volume being positioned to receive at least a portion of the service loop of cable when the service loop of cable is reinserted into the junction box through the opening in the wall panel after the service loop has been temporarily extended from the junction box through the opening in the wall panel.

40. The junction box of claim 39, wherein the volume has a peripheral portion surrounding an interior portion, the opening in the wall panel is adjacent the interior portion, the hidden portion of the volume comprises the peripheral portion, and the peripheral portion is adjacent to and covered by the portion of the wall panel defining the opening.

41. The junction box of claim 39, wherein the peripheral portion comprises an opening, the service loop of cable has a free end portion opposite a tethered end portion, and the junction box further comprises:
   an enclosure comprising the one or more interior surfaces defining the volume; and
   a cable inlet having a guide duct and a flange extending from an end portion of the guide duct, the flange sized and shaped to couple the enclosure with the guide duct located at the opening to allow communication between the guide duct and the opening, the opening being sized to allow the tethered end portion of the service loop to exit the volume therethrough, the guide duct being configured to guide the tethered end portion of the service loop outwardly and away from the opening.

42. The junction box of claim 39 for use with a receptacle, wherein the service loop of cable has a free end portion connected to the receptacle, and the receptacle is removably connected to the junction box, the receptacle being removable from the junction box to extend the free end portion of the service loop connected thereto from inside the volume of the junction box.

43. The junction box of claim 39, wherein the opening in the wall panel is covered by a removable cover plate.

* * * * *